United States Patent [19]
Alston et al.

[11] Patent Number: 5,850,472
[45] Date of Patent: Dec. 15, 1998

[54] COLORIMETRIC IMAGING SYSTEM FOR MEASURING COLOR AND APPEARANCE

[75] Inventors: David L. Alston, Holland, Pa.; Walter Borys, Robbinsville; Mark Jarvis, Burlington, both of N.J.

[73] Assignee: Color and Appearance Technology, Inc., Princeton, N.J.

[21] Appl. No.: 532,407

[22] Filed: Sep. 22, 1995

[51] Int. Cl.$^6$ .................................................. G06K 9/00
[52] U.S. Cl. ........................................ 382/162; 382/165
[58] Field of Search ................................... 382/162, 165, 382/167, 170, 191, 274; 358/516, 518, 520, 522, 406; 356/405, 406, 408, 421; 364/526; 348/187, 188

[56] References Cited

U.S. PATENT DOCUMENTS

| | | | |
|---|---|---|---|
| 4,097,892 | 6/1978 | Balding | 358/527 |
| 4,285,580 | 8/1981 | Murr | 351/242 |
| 4,574,393 | 3/1986 | Blackwell et al. | 382/162 |
| 4,583,186 | 4/1986 | Davis et al. | 364/526 |
| 4,642,682 | 2/1987 | Orsburn et al. | 358/520 |
| 4,646,134 | 2/1987 | Komatsu et al. | 348/391 |
| 4,649,566 | 3/1987 | Tsunoda et al. | 382/112 |
| 4,698,669 | 10/1987 | Sekizawa et al. | 358/509 |
| 4,812,904 | 3/1989 | Maring et al. | 348/135 |
| 4,886,366 | 12/1989 | Kogure | 356/406 |
| 5,150,199 | 9/1992 | Shoemaker et al. | 348/180 |
| 5,157,506 | 10/1992 | Hannah | 358/298 |
| 5,272,518 | 12/1993 | Vincent | 356/405 |
| 5,327,226 | 7/1994 | Tanabe | 348/188 |
| 5,410,637 | 4/1995 | Kern et al. | 395/61 |

*Primary Examiner*—Leo H. Boudreau
*Assistant Examiner*—Phuoc Tran
*Attorney, Agent, or Firm*—Woodbridge and Associates, P.C.

[57] ABSTRACT

A color and appearance measurement apparatus combines a computer controlled color video camera, controlled illumination conditions, frame grabber to digitize the video signal, and image processing methods to perform non-contact calorimetric measurements of complex patterns of color. Video images of samples placed into the field of view of the camera are digitized and converted from the color camera's red, green, and blue (RGB) color space to the internationally recognized and standardized CIE XYZ color space. A calibration process to set the dynamic range of the camera for the given illumination, correct for spatial non-uniformities in the lighting and responsivity of the detector arrays, correct for temporal variations in the lighting intensity, and determine the necessary coefficients to transform the RGB values to CIE XYZ tristimulus values ensures the measurements are highly repeatable and that measured color and appearance differences are in agreement with visual observations. Visual appearance attributes of the samples such as color, texture, and gloss are measured and evaluated. These measurements provide quantifiable metrics, to which various color and appearance attributes of other samples can be compared, for quality control inspection of complex colored samples that cannot be measured using conventional color measuring instruments.

30 Claims, 19 Drawing Sheets

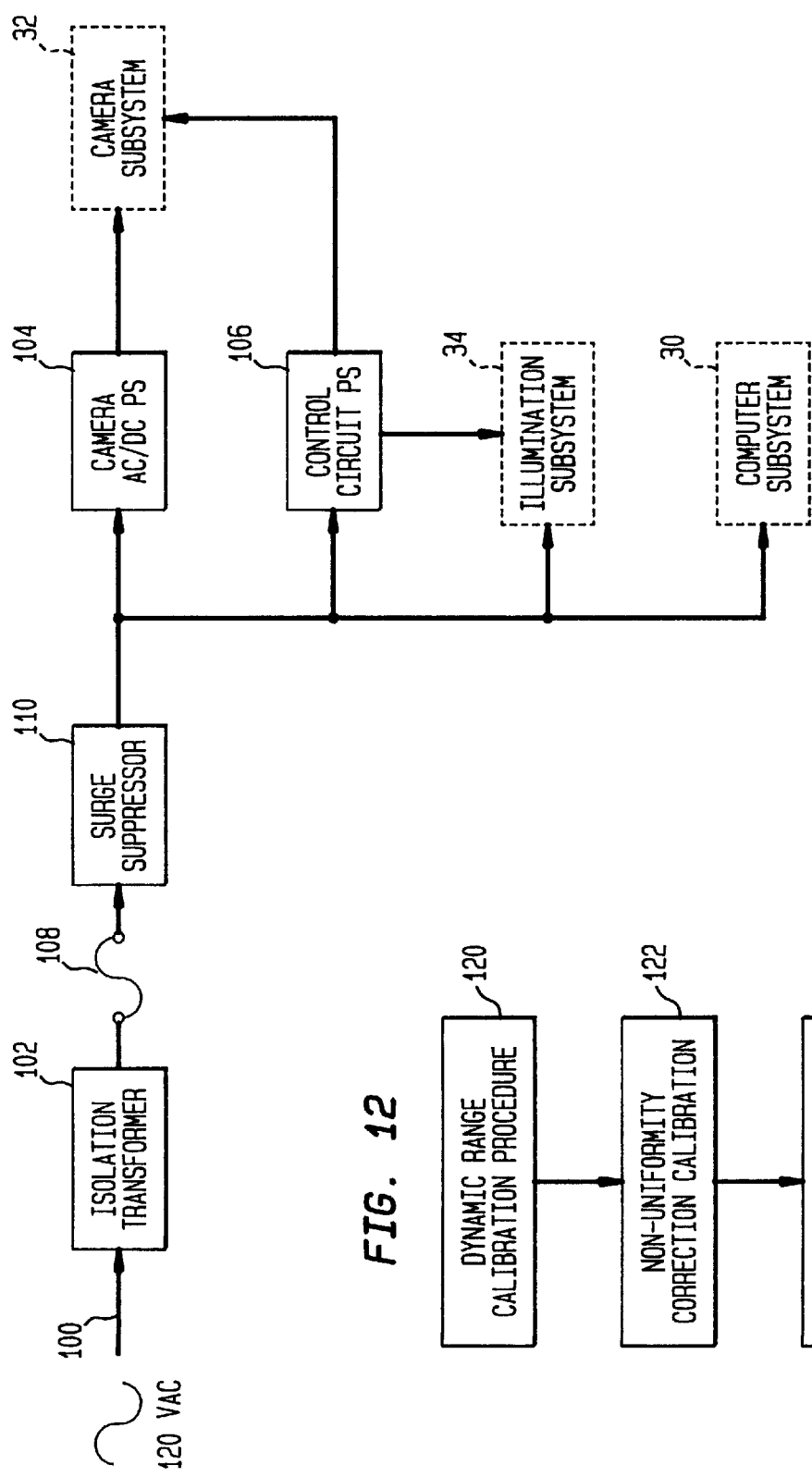

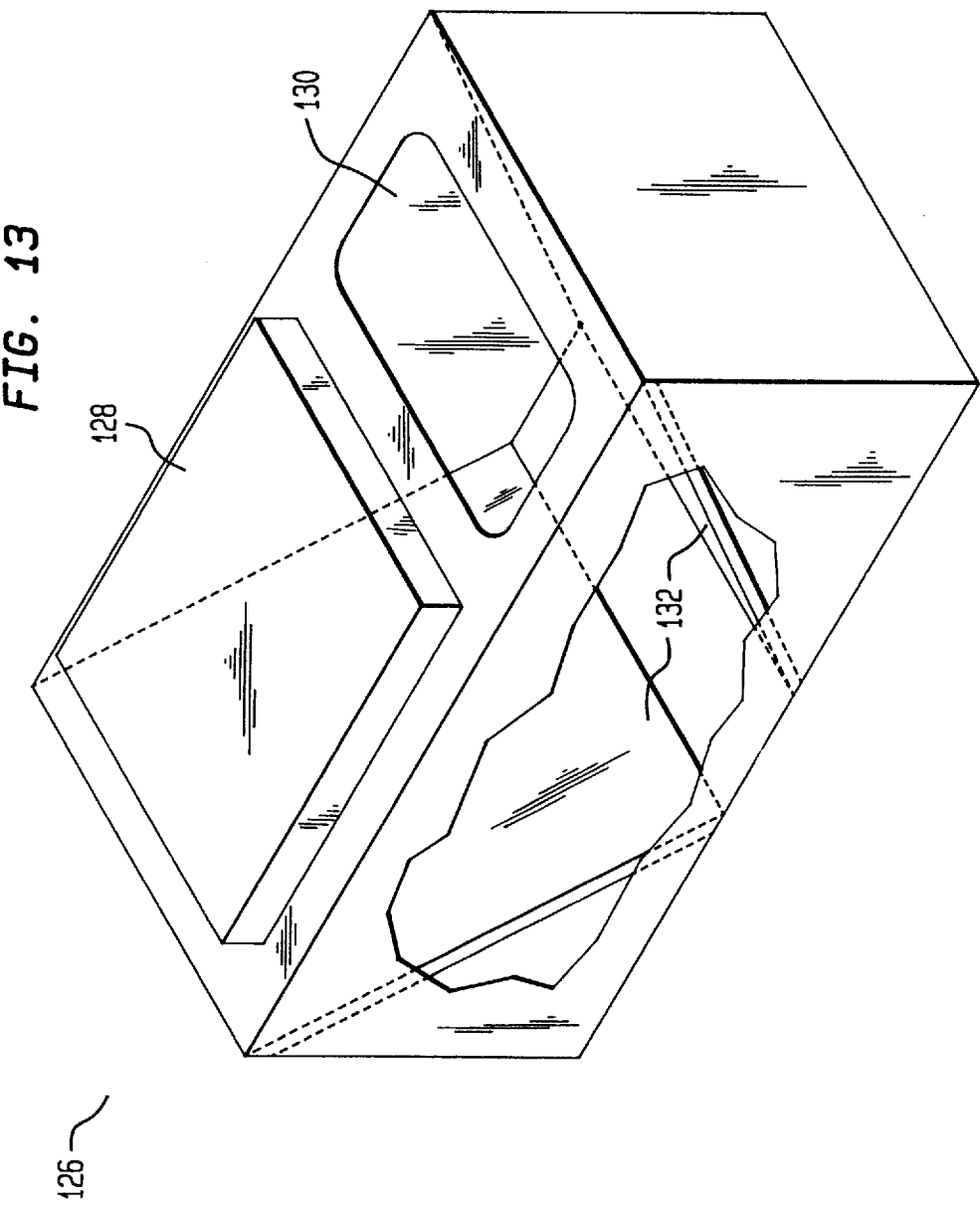

COLORIMETRIC IMAGING SYSTEM FOR MEASURING COLOR AND APPEARANCE

BACKGROUND OF THE INVENTION

1. Field of the Invention

This invention relates to non-contact measurement of the color and appearance of samples using a computer, color camera, and controlled illumination system and affords a means to measure and quantify complex patterns of color and appearance in several color space coordinate systems.

2. Description of Related Art

Colorimeters and spectrophotometers have traditionally been used in quality control, shade sorting, and formulation without the ability to differentiate the visual effects that texture variations on the sample surface have on overall appearance. These instruments typically come in two standard geometries, sphere and 0°/45° (or 45°/0°), requiring a large flat uniform area of color. Until recently, there has been no way to measure spatial color. That is, color where the texture is not uniform, or where surface characteristics change with illumination or viewing angle. The only type of device that can accomplish a spatial color measurement is a color camera. The color camera is colorimetric in design, in that it uses three primary colored filters to designate color. Each spatial position on the detector array, or pixel, is capable of collecting this calorimetric data. The result is a group of colors, spatially arrayed, so the color pattern differences of the viewed area are maintained. These image data can then be analyzed to determine color distributions, texture, and other appearance attributes of the sample under test.

One approach to solving the problem of measuring complex spatial patterns of color has been to measure samples using a color camera and statistically compare captured images of test samples with pre-stored representations of reference samples. U.S. Pat. No. 4,812,904 describes a process for optical color analysis that incorporates a computer with a frame grabber, color camera, and predetermined lighting within a light booth to capture images of samples to be analyzed and statistically compared against a reference sample. The mean and standard deviation of the red, green, and blue (RGB) values for all the pixels within a predetermined spatial region of the camera's field of view are calculated for each sample measurement. This apparatus does not provide compensation for spatial variations in the lighting or those that are inherent in the charge-coupled device (CCD) cameras used to capture the images of the samples. All color calculations are performed in the RGB color-space of the color camera, which does not characterize color in the same way the human eye and brain respond to color. This measurement method requires precise placement of the sample in the measurement apparatus to obtain repeatable results and yields color difference values that do not always agree with visual observations of the samples being compared.

U.S. Pat. No. 5,150,199 describes a possibly related method to transform RGB values from a color camera to CIE XYZ values using an iterated regression and multi-variant regression analysis methods. This method requires the measurement of approximately 186 samples, with 37 of these having near zero chroma at various lightness levels, to achieve good results.

U.S. Pat. Nos. 4,285,580, 4,097,892, 4,583,186, 4,642,682, and 4,698,669 represent possibly related systems concerning color imaging and processing while U.S. Pat. Nos. 4,574,393, 4,646,134, and 4,649,566 represent possibly related systems concerning image signal processing.

U.S. Pat. No. 5,410,637 concerns color tolerancing analysis of samples.

A practical solution to the problem of quantifying the color and appearance attributes of spatially complex patterns of color and texture, producing results consistent with visual observations when two samples are compared, is not found in the prior art.

SUMMARY OF THE INVENTION

Briefly described, the invention comprises computer controlled color video camera, controlled illumination, frame grabber to digitize the video signal, and image processing methods integrated into a system that allows non-contact measurement of the color and appearance of samples. The invention affords a means to measure complex patterns of color, quantify the various color and appearance attributes of the sample, and compare its color and appearance attributes to those of a pre-stored standard. This system provides for quality control inspection of complex colored samples that cannot be measured using conventional color measuring instruments, such as spectrophotometers and calorimeters.

Video images of samples placed into the field of view of the camera are digitized and converted from the color camera's red, green, and blue (RGB) color space to the internationally recognized and standardized CIE XYZ color space. The color camera is calorimetric in design, in that it uses three primary colored filters to designate color. Each CIE XYZ tristimulus value is converted to calorimetric coordinates of lightness, chroma, and hue (L*C*h), integrated for the light source used to capture the image of the sample. Each spatial position on the detector array, or pixel, collects this calorimetric data. The resulting group of colors is arranged spatially so that color pattern differences of the viewed area are maintained. These image data are then analyzed to determine color distributions, texture, and other appearance attributes of the sample.

A calibration process is employed to ensure the invention is highly repeatable and produces measurements that agree with visual comparisons made by trained observers. The first phase of the calibration process automatically determines the appropriate amplifier gain and video pedestal settings to set the dynamic operating range of the camera system for the defined lighting conditions. Spatial non-uniformities in the lighting and in the responsivity of each of the three detector arrays of the camera are mapped during the second phase of the calibration process. The third phase of the calibration process is performed to determine coefficients necessary to transform the RGB color values provided by the camera to the tristimulus values of CIE XYZ color space A dual beam correction standard is also captured during the third phase of the calibration process and its values are stored to provide a method to compensate for lighting intensity variations of the illumination source. This calibration procedure provides a common reference point for all measurements of color and appearance made using the invention.

Samples are placed within the field of view of the camera, captured, corrected for lighting variations and spatial non-uniformities, transformed to CIE XYZ tristimulus values, and converted to L*C*h values. The color and appearance attributes of the sample are defined in terms of the L*C*h color space coordinates of the image, and not in terms of the spatial position of the attribute. Colorimetric analysis is performed to compare the color of each defined attribute to that of a pre-stored standard. Optional analysis techniques can also be enabled to quantify and compare such aspects of the sample's appearance as gloss, cluster size, quantity of clusters, grain size, grain density, and numerous other appearance attributes.

BRIEF DESCRIPTION OF THE DRAWINGS

FIG. 11 is a schematic diagram of the power subsystem components and their interconnections to the other subsystems in a color and appearance measurement system.

FIG. 12 overviews the tasks to be performed for proper calibration of a color and appearance measurement system.

FIG. 13 is a perspective view of a dynamic range calibration standard, with its white point and black point calibration standards incorporated into one unit.

DETAILED DESCRIPTION OF THE INVENTION

During the course of this description like numbers will be used to identify like elements according to the different views which illustrate the invention 10.

Figure 1:
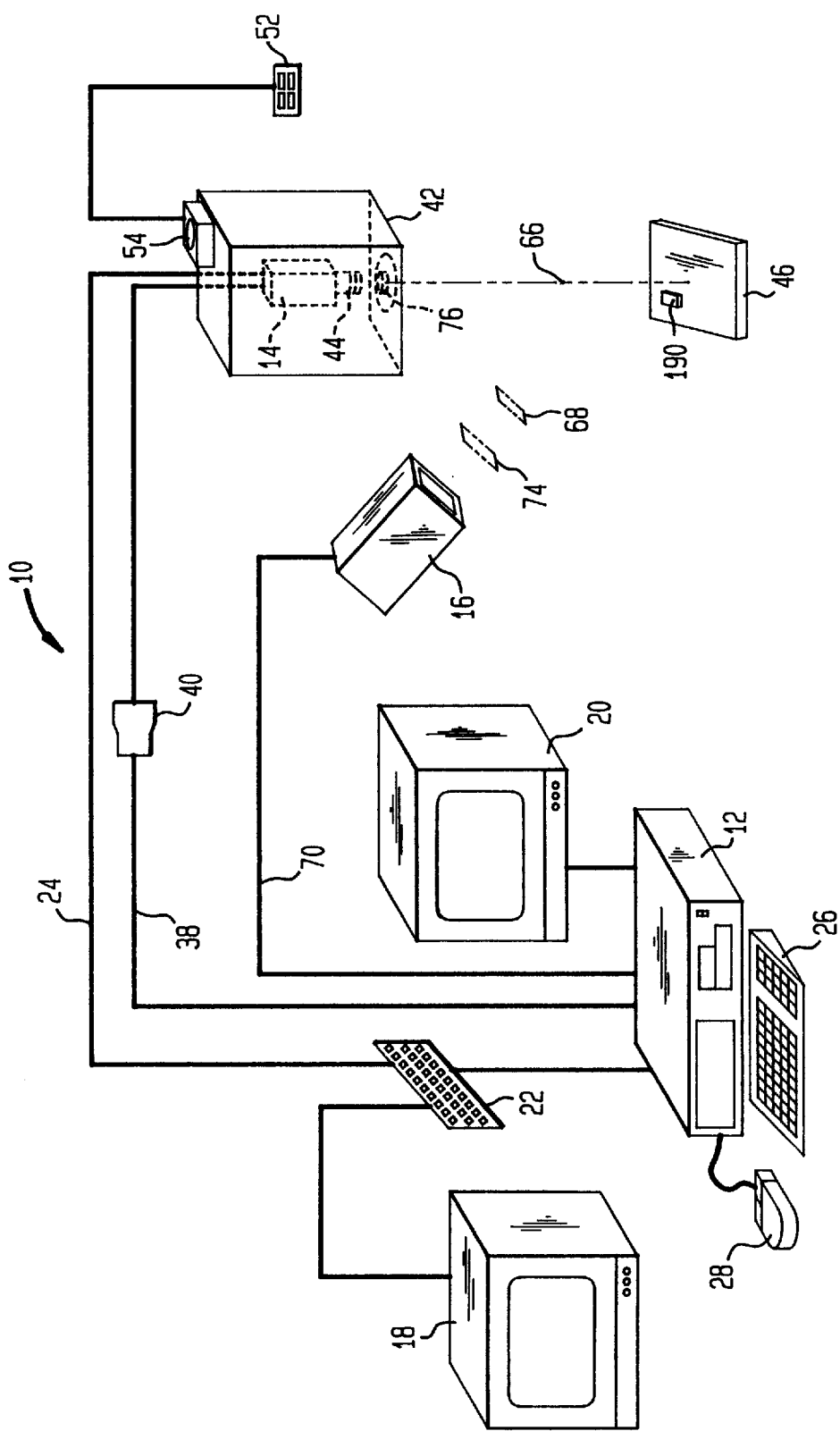
FIG. 1 is a perspective view of a color and appearance measurement system, depicting a computer controlled color camera in a temperature controlled housing, controlled illumination source, and computer with its associated data display and image display monitors.

The preferred embodiment of the invention 10 is illustrated in FIG. 1 as a computer based imaging system to quantify tristimulus color measurements (as defined by the Commission Internationale de L' Éclairage (CIE) in publication CIE No. 15.2) for samples that cannot be measured using conventional color measuring instruments. The tristimulus values are converted to recognized color indices, such as CIE L*C*h. The invention 10 uses a computer 12 to control a color camera 14 and illumination source 16 for measuring the colorimetric values of non-uniform and irregular surfaces that cannot satisfactorily be measured using existing color measuring instruments, such as spectrophotometers and calorimeters.

Figure 2:
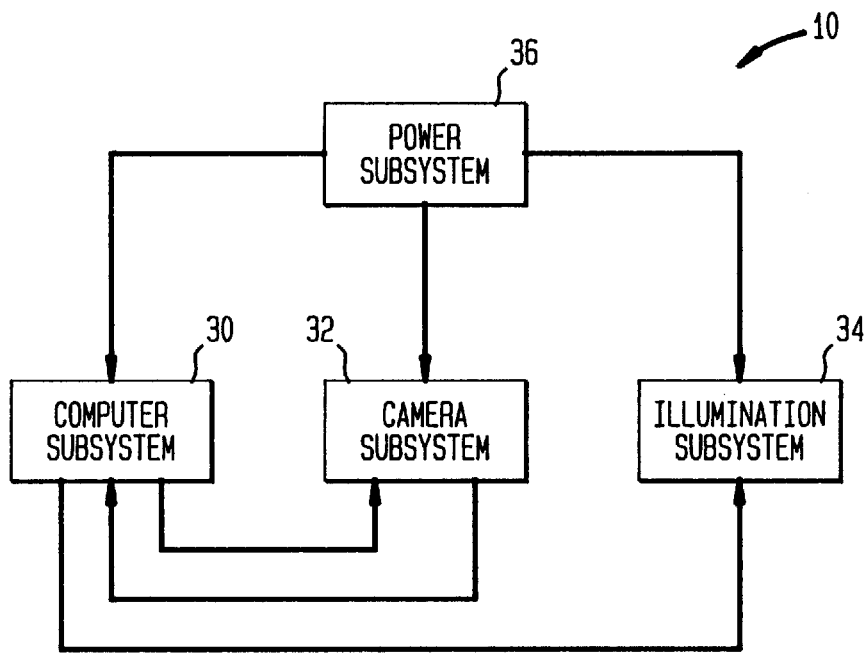
FIG. 2 represents a schematic diagram of the major subsystems and their interconnections that comprise a color and appearance measurement system.

The invention 10 consists of a computer 12 with an image display monitor 18 and a data display monitor 20, temperature controlled color camera 14, image capture or frame grabber card 22, light source 16, and associated power supplies. The computer 12 houses the frame grabber card 22 which receives the video signal 24 from the camera 14, and provides a means to process and display the captured video image, via the image display monitor 18, to the system operator. FIG. 2 is an overview of the major subsystems of the invention 10 and their interdependencies. The computer subsystem 30 provides control signals to the camera and illumination subsystems 32 34, and processes the image data gathered by the camera subsystem 32. The power subsystem 36 provides power to the other subsystems and is conditioned and filtered to ensure maximum performance and reliability from the invention 10.

The invention 10 captures an image from the color camera 14 consisting of three color planes (red, green, and blue -or- RGB). Each captured image is digitized and stored within the frame buffer of the frame grabber 22 into a color image comprising at least 24 bits of digital data, with at least eight bits per channel. The RGB values for each pixel are then converted to CIE XYZ tristimulus color space, integrated for the given illuminant/observer condition. This processing converts the image data from the device dependent color space of the color camera 14 to a device independent color space based on accepted CIE standards. Lightness, chroma, and hue (L*C*h) values are calculated for each pixel in the given image. The CIE L*C*h color space is chosen because it is the color space that is most intuitive for defining tolerances, as it most closely matches the way color is typically described. Color is three dimensional in nature and people generally describe the hue using descriptors like red, yellow, green, or blue. The lightness axis of L*C*h color space is often referred to using descriptors such as light or dark, while chroma refers to the saturation level of the color, with descriptors like pastel for low chroma colors and deep or intense for high chroma colors.

Figure 3:
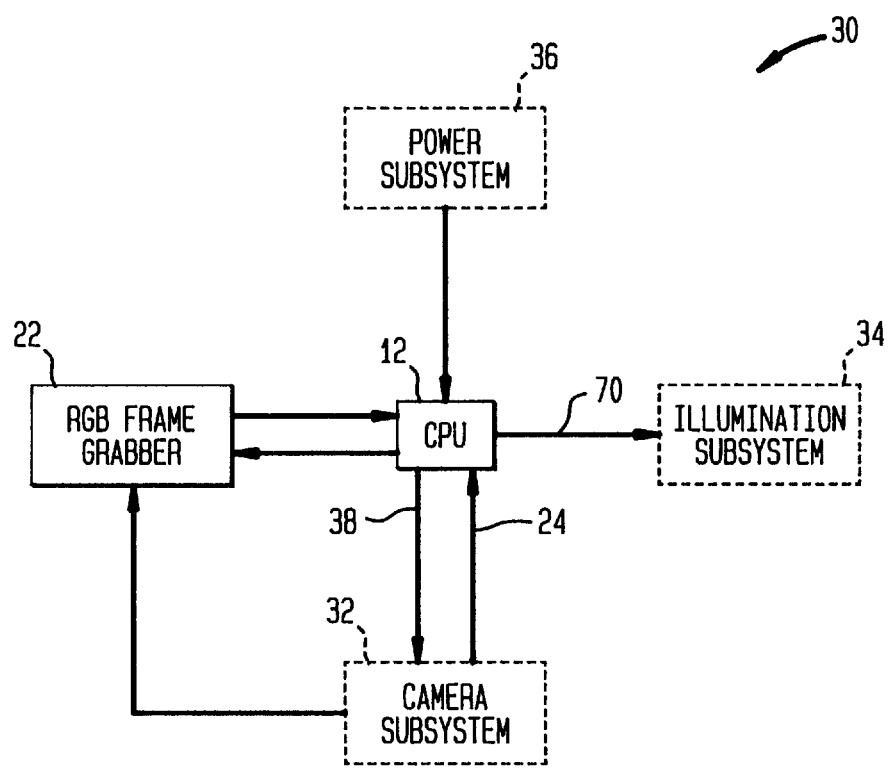
FIG. 3 is a schematic diagram of the computer subsystem, consisting of the CPU and RGB frame grabber and their interconnections to the other subsystems of a color and appearance measurement system.
Figure 4:
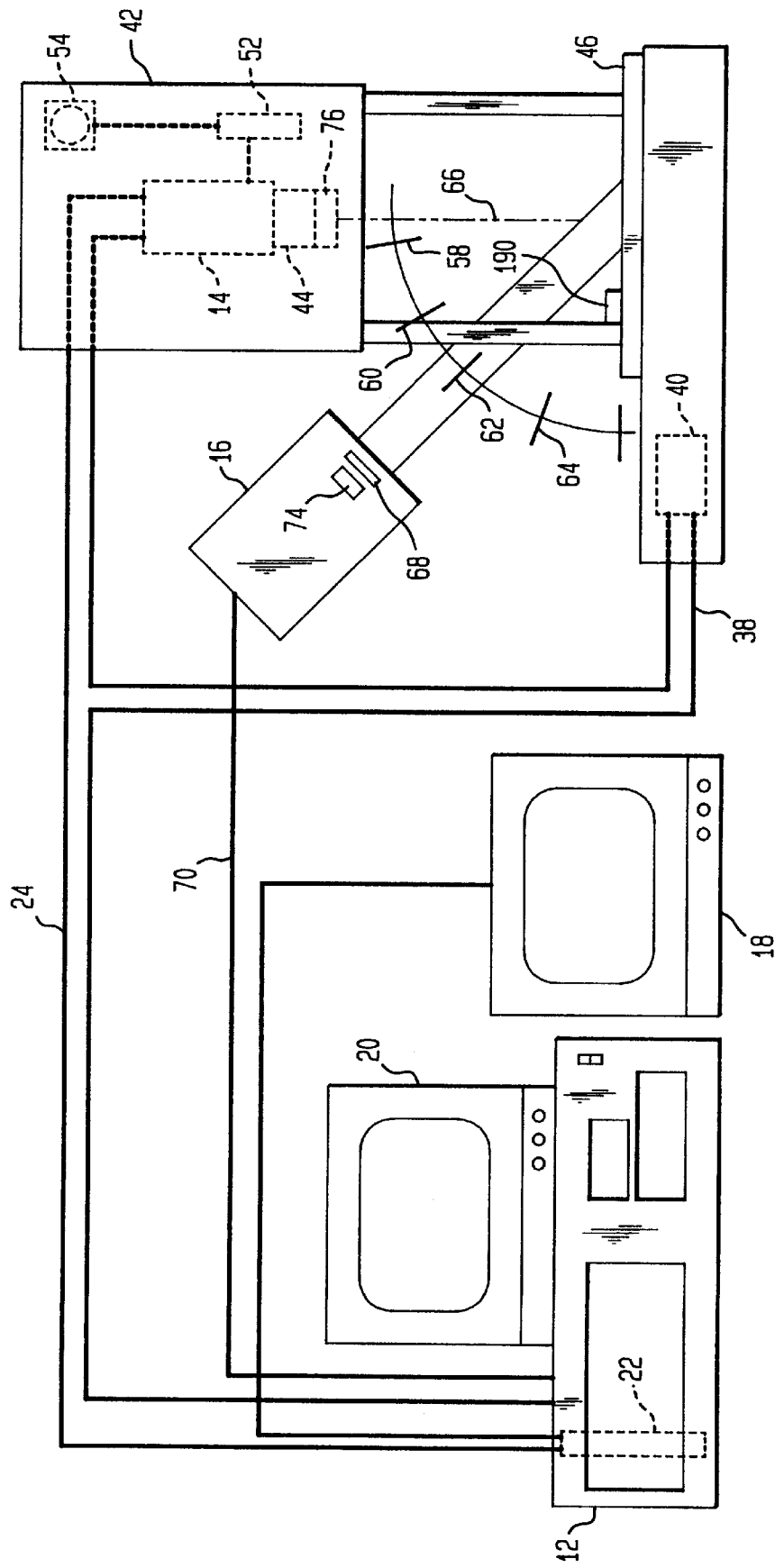
FIG. 4 depicts a frontal view of one embodiment of a color and appearance measurement system, depicting a color camera in a temperature controlled housing, pulsed xenon strobe lamp with adjustable angles of illumination, and a computer with its associated data display and image display monitors.

All functions to control the camera, timing, and illumination in the invention 10 are performed by the computer 12. FIG. 3 illustrates the components and interfaces of the computer subsystem 30. The computer 12 is programmed to monitor the incoming video stream 24 from the computer and to instruct the frame grabber 22 how and when to capture the appropriate frame of video data based upon the input from the system operator. The image data is transferred from the frame grabber 22 to the main memory of the computer 12 for processing by the host processor of the camera RGB data into CIE XYZ tristimulus values. This processing can alternately be performed by auxiliary processing hardware, such as the Imaging Technology VISIONplus® Image Processing Accelerator (VIPA) which features a floating point digital signal processor (DSP), instead of the previously described method. The computer 12 is also programmed to transmit control commands to the camera using a standard RS-232 interface 38. The camera control signals are translated by a Sony SCI-537 interface adapter 40 to convert the 8-bit RS-232 protocol to the 16-bit protocol required by the Sony DXC-930 camera 14 that is housed in the temperature controlled enclosure 42 of FIGS. 1, 4, 5, and 6. The strobe lamp, depicted in one embodiment of the invention 10 in FIGS. 1 and 4, is triggered by the computer 12 to pulse its xenon flashlamp. A keyboard 26 and mouse 28, or equivalent pointing device, are provided for operator input. All data and operator instruction are displayed on the data display monitor 20. The data display and image display can be merged and displayed on a single monitor with the appropriate frame grabber hardware.

Figure 7:
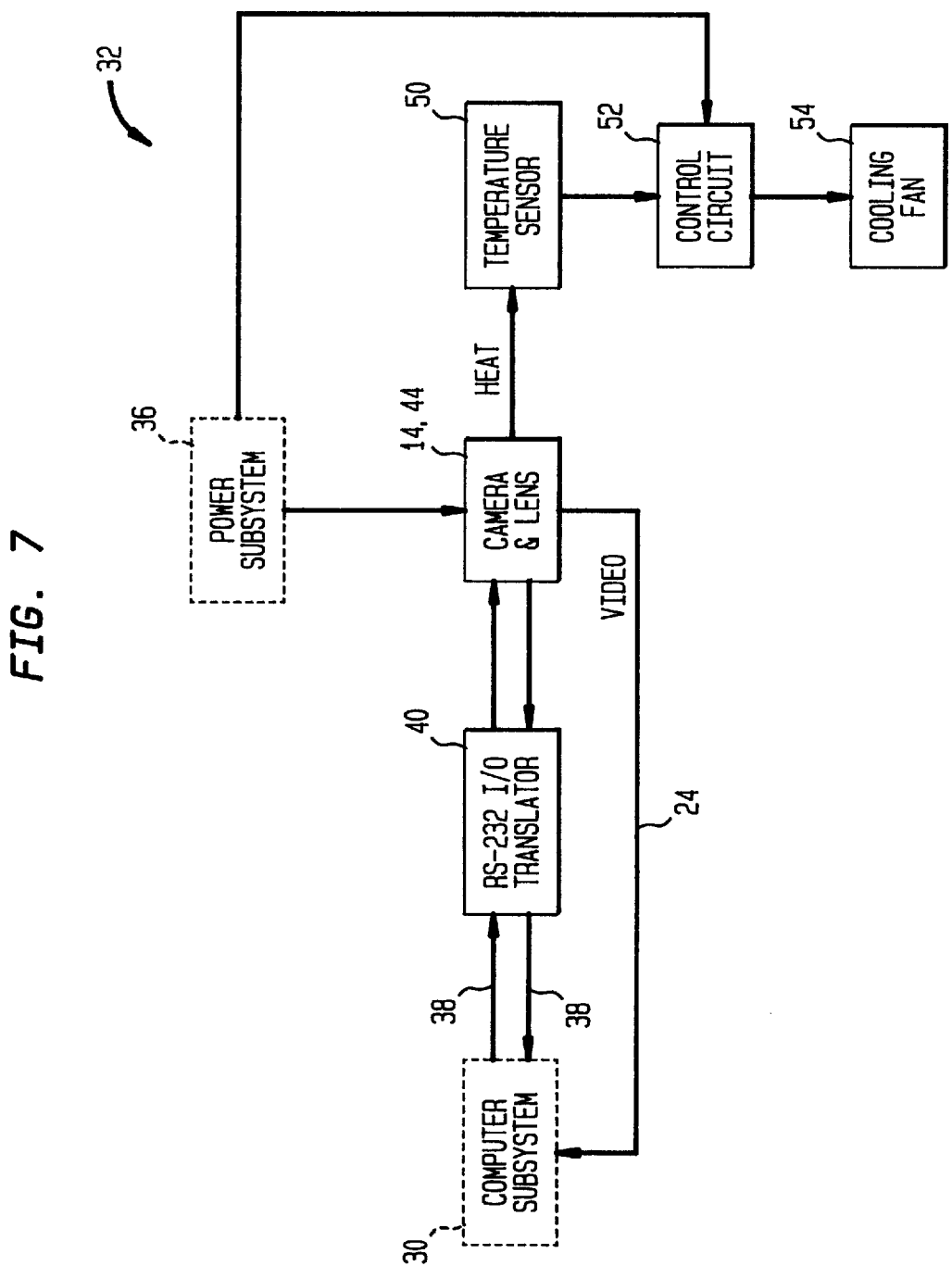
FIG. 7 is a schematic diagram of the camera subsystem components and their interconnections to the other subsystems of a color and appearance measurement system.

FIG. 7 depicts the components of the camera subsystem 32 and their interactions with one another, and with the computer 30 and power 36 subsystems. The camera 14 is housed in a temperature controlled enclosure 42 and positioned so the optical axis of the camera lens 66 is orthogonal to the sample being measured 46. Light from the controlled light source 16 is reflected from the sample 46 and focused by the lens 44 onto the three charge coupled devices (CCDs) of the camera 14. The three CCDs are mounted on a dichroic filtered beamsplitting prism block that separates the incoming light flux into its three component RGB colors. The CCDs convert the light energy striking their surfaces into electrical energy which is transformed to the video signal 24 provided by the camera 14. The camera circuitry includes electrically erasable programmable read only memories (EEPROMS) that contain various settings for the different amplifier gain and pedestal settings of the video generator circuitry. The contents of these memory locations are programmable via commands issued over a standard RS-232 serial communications interface 38, as translated by the Sony SCI-537 interface adapter 46. The camera is mounted on a 5-axis mount 48 that permits linear motion of the camera 14 along three orthogonal axes and rotation about two axes. The temperature of the camera 14 is monitored using a thermistor 50 and temperature control circuit 52. The temperature control circuit 52 turns on and off a small fan 54 that has its air stream deflected by an air deflector 56 so it passes over the length of the camera 14, cooling it and maintaining the temperature of its internal electronics to within ±2° C. The temperature control circuit 52 has virtually no hysteresis, so the fan 54 is never fully energized as the fan 54 is turned off as soon as the thermistor 50 detects the reduction in the temperature of the camera 14. This reduces the oscillations in the temperature of camera 14 that can occur using other cooling methods.

The light source depicted in FIGS. 1 and 4 is a pulsed xenon strobe lamp positioned to illuminate the sample 46 surface from any one of four different angles. This embodiment of the invention 10 requires that the camera 14 be programmed with its electronic shutter set so it integrates the incoming light flux on its three CCDs for only $\frac{1}{6000}$th of a second to prevent the ambient light of the surrounding environment from influencing the calorimetric measurements of the invention 10. The entire pulse of light energy from the pulsed xenon strobe lamp 16 must be contained within the $\frac{1}{6000}$th of a second window of opportunity set by the camera electronic shutter to ensure consistent color measurements. This requires a timing circuit with resolution better than 50 microseconds. The illustrated embodiment of the invention 10 provides selectable illumination angles of 20°, 30°, 45°, and 70° from the optical axis of the camera lens 66. This configuration provides a bi-directional lighting system analogous to that employed by a goniospectrophotometer, where the illumination angle is changed to measure sample color and appearance variations as a function of illumination angle and the sample is viewed from 0° relative to its surface normal. The pulsed xenon strobe lamp 16 has a correlated color temperature of 6500K, which can be filtered to other correlated color temperatures using optical filters 68. The strobe lamp gives the system the ability to freeze moving objects, capturing an image in at least $\frac{1}{6000}$th of a second. This feature permits the use of the system in a open environment without need for a light booth.

Figure 8:
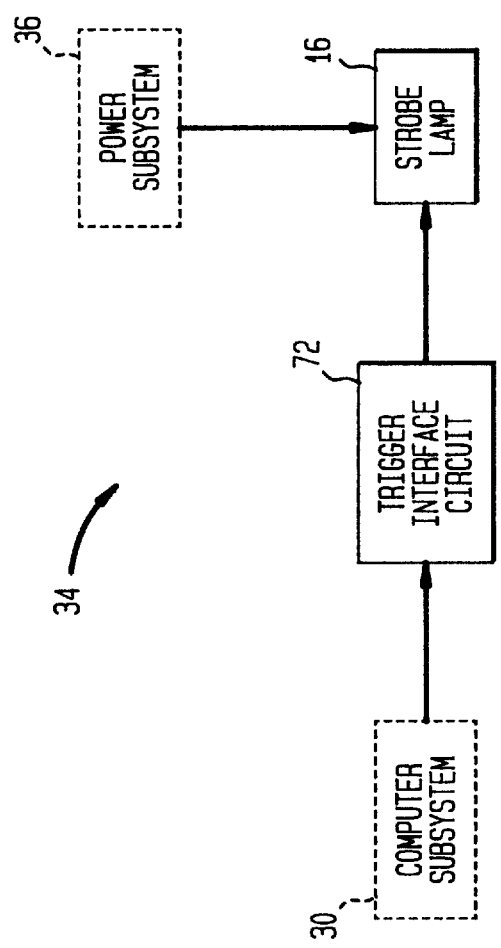
FIG. 8 is a schematic diagram of one embodiment of the illumination subsystem components, including a strobe lamp and its trigger circuit, and their interconnections to the other subsystems of a color and appearance measurement system.

FIG. 8 represents the illumination subsystem 34 using a pulsed xenon flash lamp as the illumination source 16. The timing signal instructing the strobe to trigger the xenon flash lamp is transmitted to the strobe lamp unit via the RS-232 interface 70 through the interface circuit 72 that translates the ±12 volt signal levels of the RS-232 interface to the 5 volt signal level required by the trigger circuit of the EG&G MVS 2000 strobe lamp. The strobe trigger interface circuit 72, housed within the NEMA 13 enclosure of the strobe lamp, receives its power directly from the RS-232 interface 70 by maintaining a constant signal level on the Data Terminal Ready line of the interface. This obviates the need for an auxiliary power source to energize the circuit. The strobe uses a parabolic reflector and fresnel lens to focus the energy from the flash lamp into a directed beam. A linear polarization filter 74 and color temperature compensation filter 68 are placed in the optical path of the light beam within the housing of the strobe lamp. The correlated color temperature of the strobe is altered to the desired color temperature by the color temperature compensation filter 68. The polarization filter 74 polarizes the light beam from the strobe lamp. The polarization of the light beam can be used to reduce specular reflections from the sample 46 surface when a second polarizer 76 is placed in front of the camera lens 44 and is oriented so its polarization axis is perpendicular to that of the light source. This method improves the color contrast for many measurement circumstances.

Figure 5A:
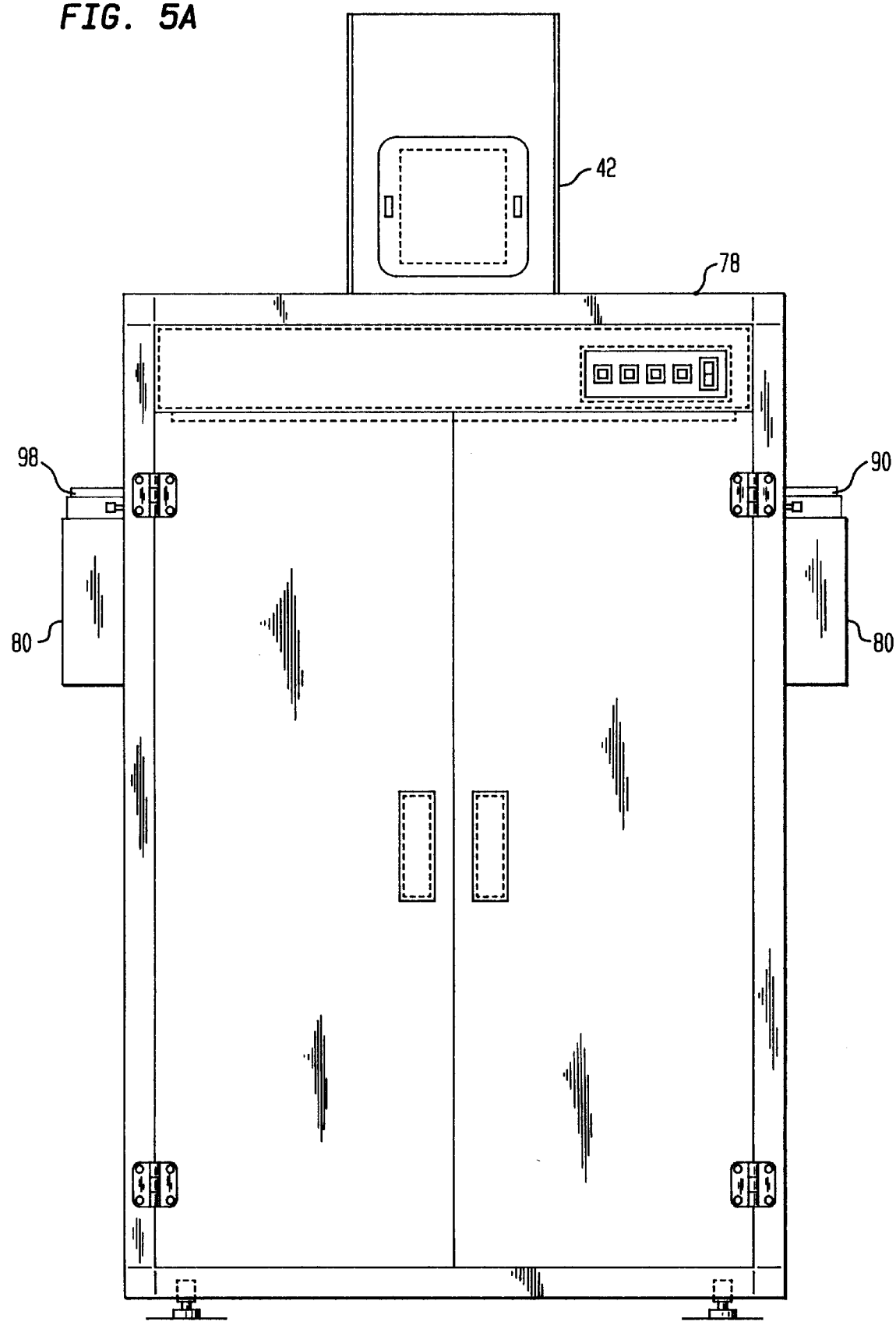
FIGS. 5A–5B illustrate frontal and left side views of a second embodiment of a color and appearance measurement system, with a controlled illumination chamber, temperature and voltage controlled fluorescent lighting, temperature controlled color camera, and self-contained power supplies and controllers.
Figure 5B:
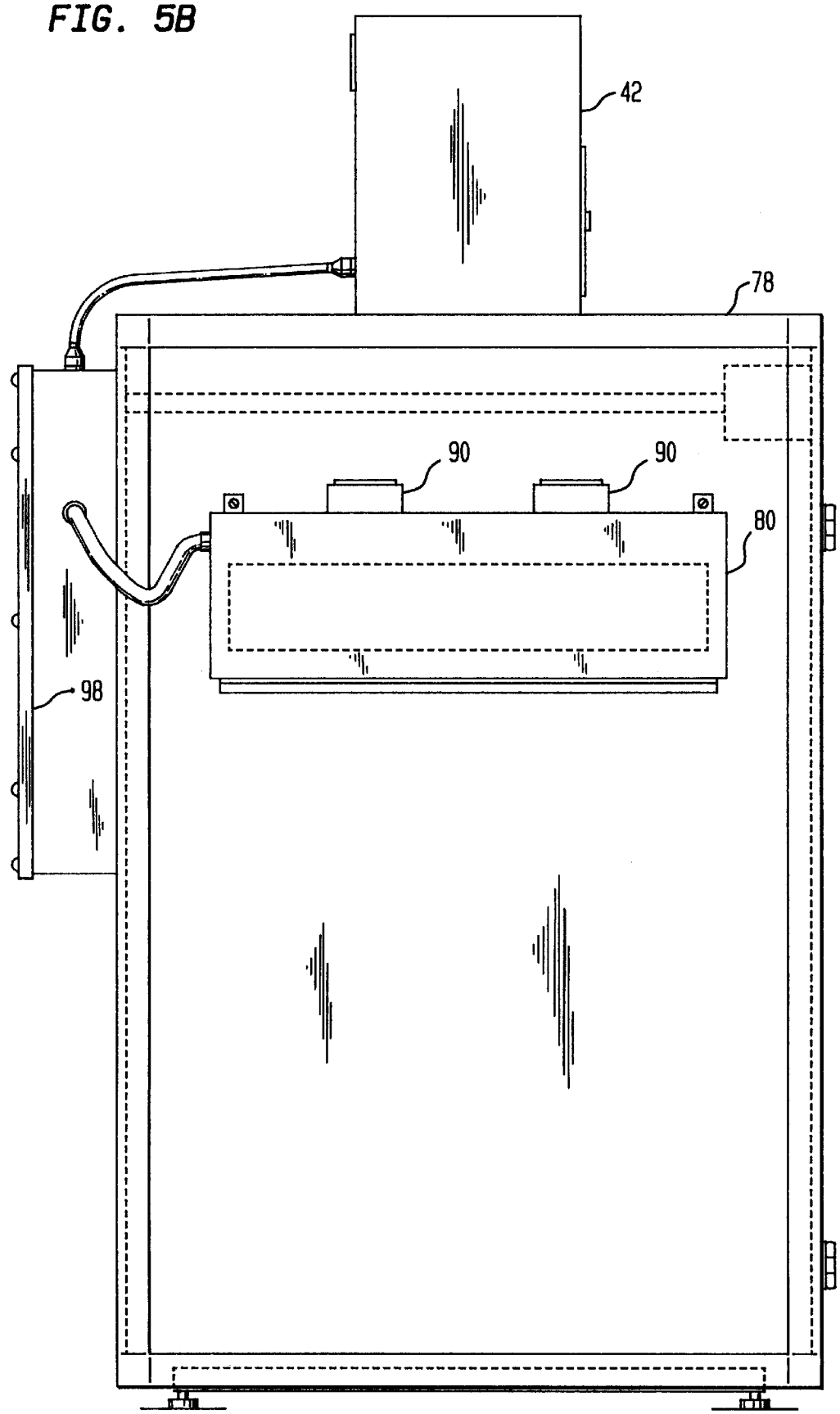
Figure 6A:
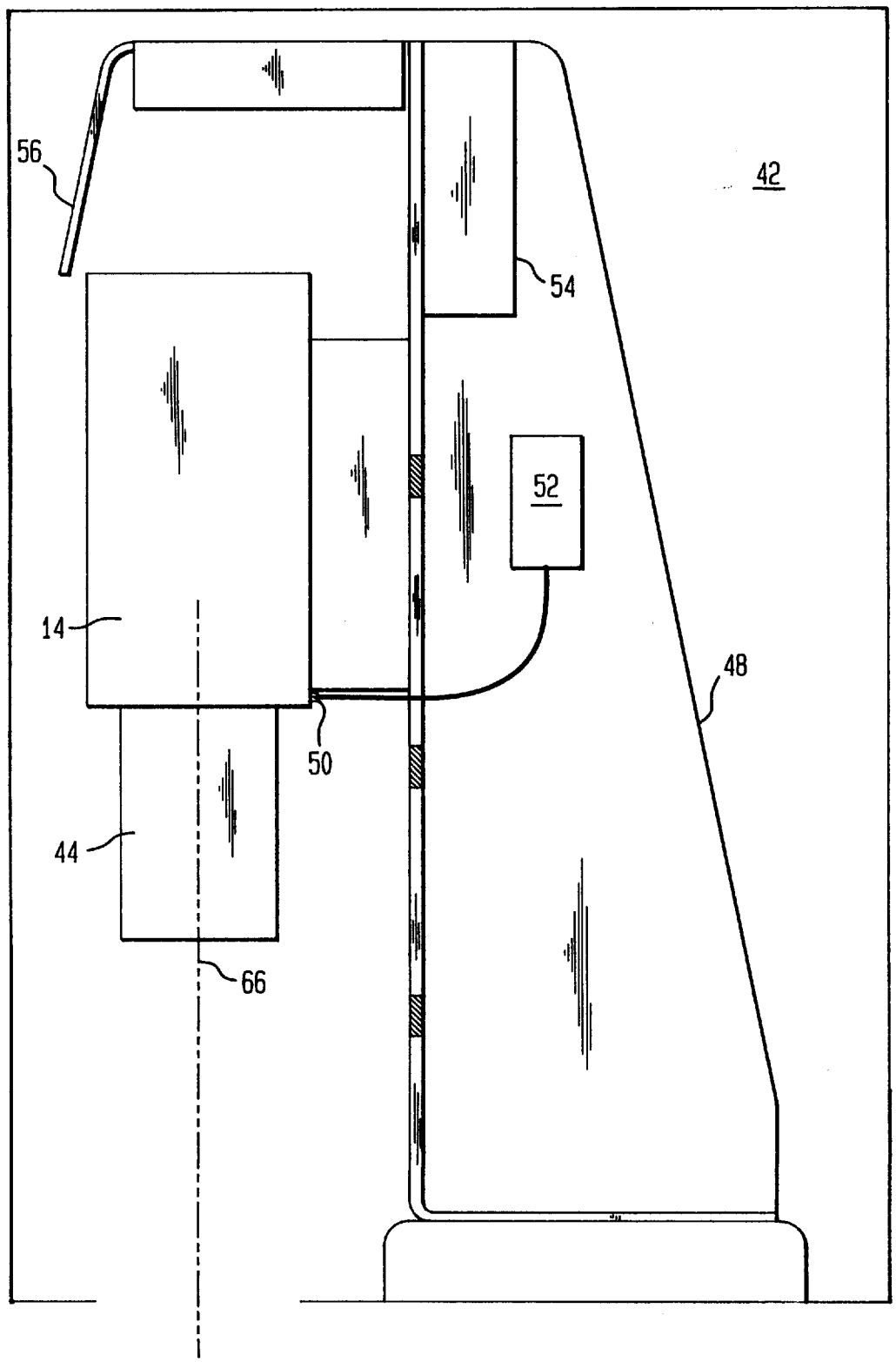
FIGS. 6A–6B depict right side and top views of a color camera and temperature monitoring and control apparatus mounted on its 5-axis mount within the temperature controlled enclosure.
Figure 6B:
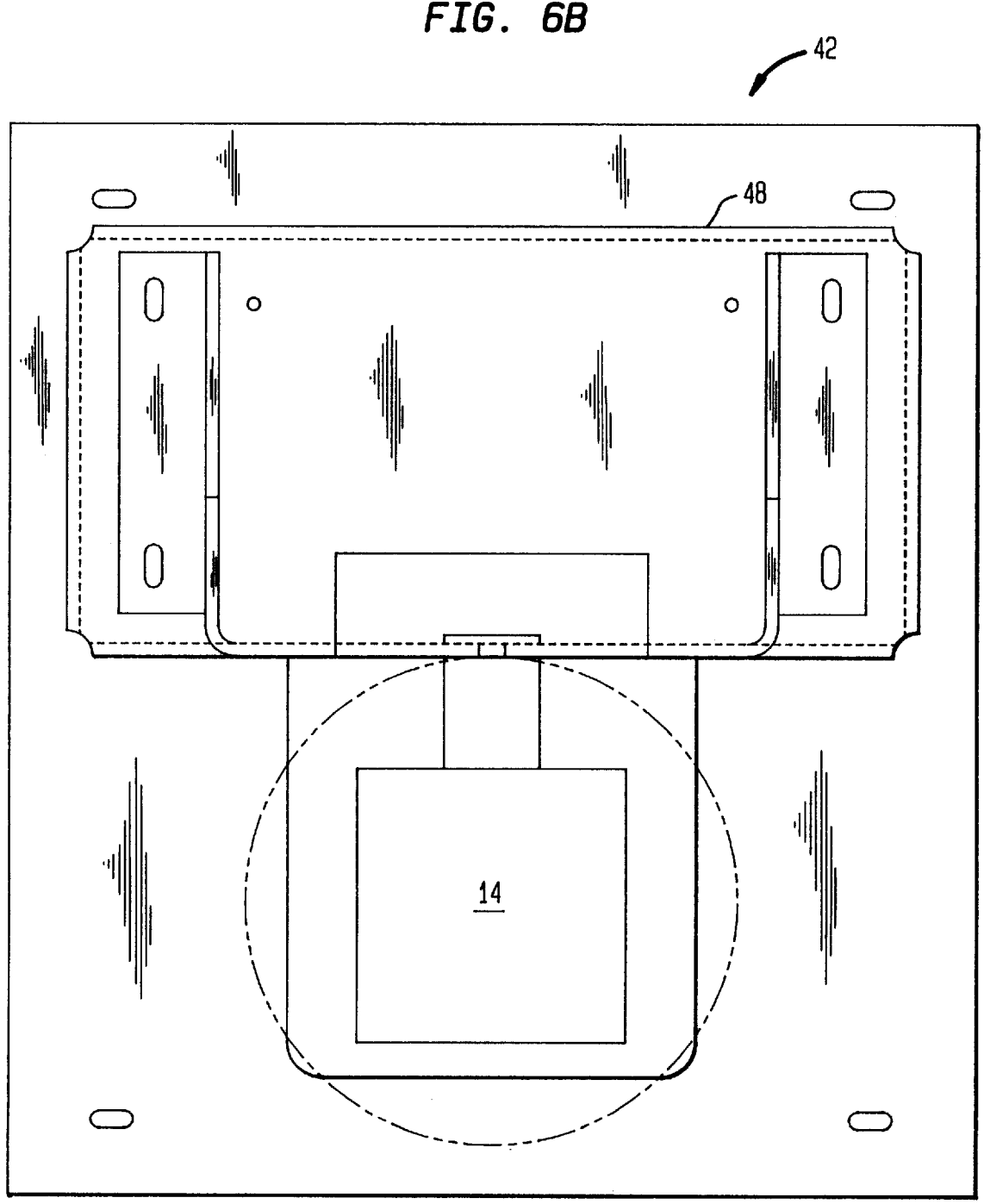

FIG. 5 illustrates a second embodiment of the invention 10 with fluorescent lamp lighting within a controlled illumination chamber 78. This configuration provides a forward diffuse lighting system analogous to that employed by a sphere-based spectrophotometers, where the illumination is diffuse, and the sample is viewed from 0° relative to its surface normal.

Figure 9:
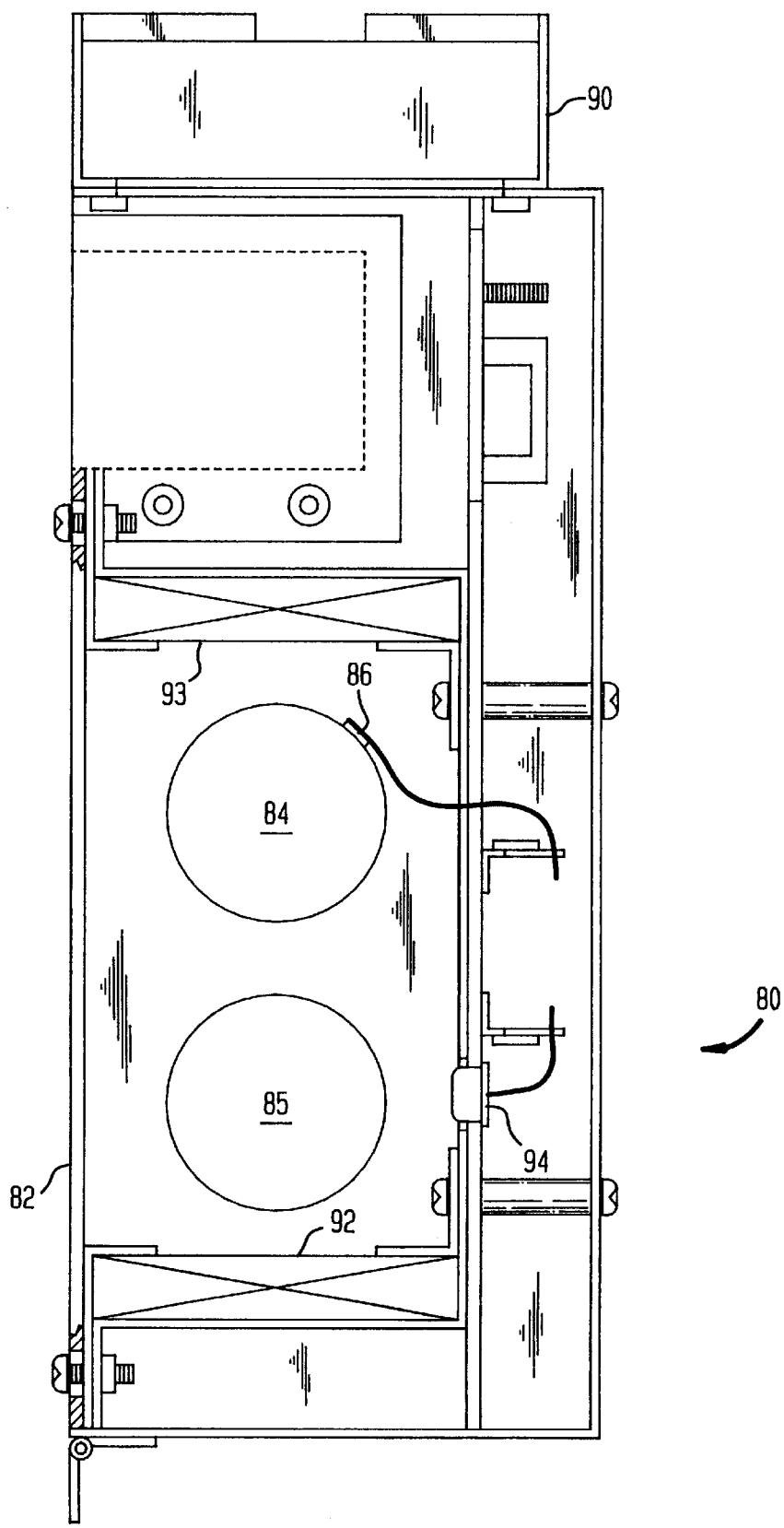
FIG. 9 represents an end view of a fluorescent lamp enclosure for a second embodiment of the illumination source; depicting the temperature monitoring and control, and lamp intensity monitoring apparatus for the fluorescent lamps.
Figure 10:
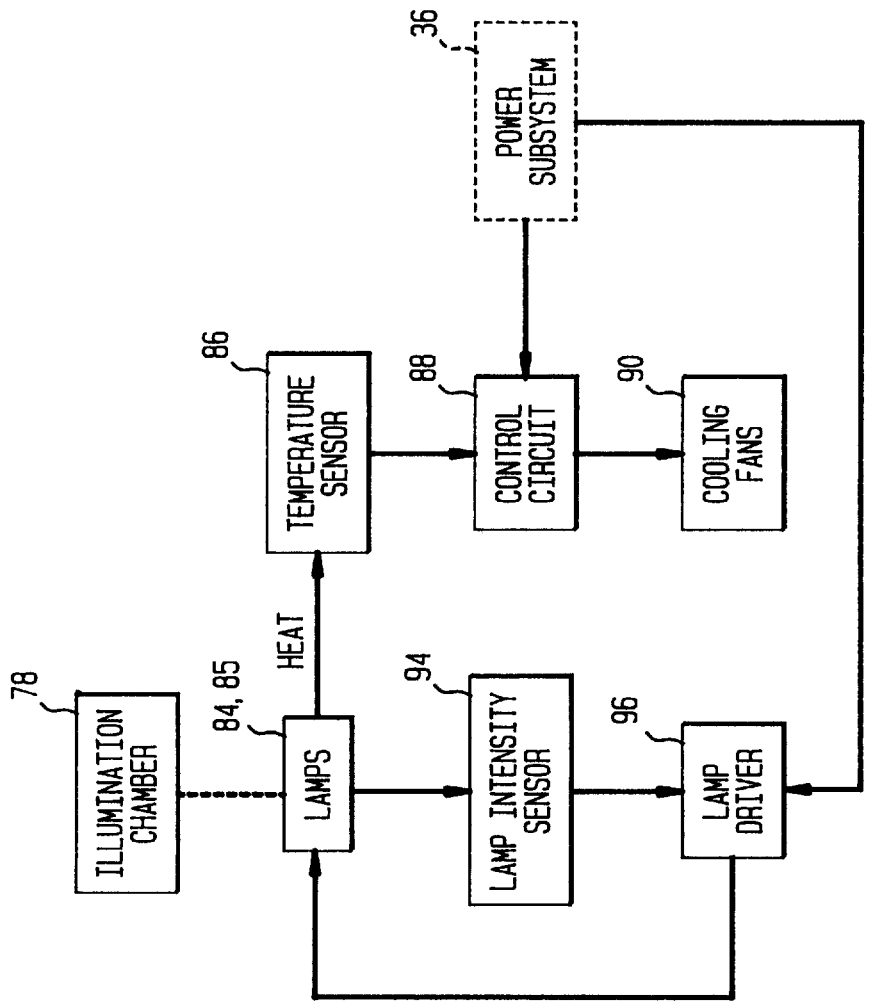
FIG. 10 is a schematic diagram of the components for a second embodiment of the illumination subsystem, using fluorescent lamps, and the interconnections to the other subsystems of a color and appearance measurement system.

FIGS. 9 and 10 illustrate the lamp enclosure 80 and a block diagram of the interaction of the illumination subsystem components. Two lamp enclosures 80 are mounted on the exterior of the controlled illumination chamber 78 and are isolated from it using a sheet of optically clear acrylic 82 for each enclosure 80. This allows the light from the lamps 84 85 to enter the illumination chamber 78, but isolates the airflow of the lamp cooling system from the illumination chamber 78. The temperature of the fluorescent lamp 84 in each lamp enclosure 80 is measured using a thermistor 86. The resistance of the thermistor 86 changes as the temperature of the lamp 84 changes, which is measured by the temperature control circuit 88 to control the cooling flow of air across the lamps 84 85 by turning fans 90 on and off. The circuit 88 is operated with virtually no hysteresis. The fans 90 are turned on when the lamp 84 temperature reaches its set point and are turned off as soon as the temperature of the lamp 84 drops below its set point. This action means that the fans 90 are never fully energized and maintains the temperature well within the ±1° C. temperature range required to maintain a constant light intensity from the lamps 84 85. Filters 92 93 are positioned in the air flow to prevent cool spots from forming on the lamps 84 85, eliminating mercury condensation on the interior walls of the lamps 84 85. The lamps 84 85 are driven at a frequency of 60 kHz to prevent aliasing with the video signal that occurs with standard 60 Hz lamp ballasts. The intensity of the light output from the lower lamp 85 in one of the lamp enclosures is monitored using a photodiode 94. The voltage from this photodiode 94 is conditioned for feedback into the LBI Icecap 60 kHz lamp driver 96 to control the voltage level output by the driver.

FIG. 5 depicts the temperature controlled camera enclosure 42 mounted on the top of the controlled illumination chamber 78 so the optical axis of the camera lens is orthogonal to the floor of the chamber. The two lamp enclosures are mounted on the exterior of the sides of the light booth. Light from the lamp enclosures 80 enters the illumination chamber 78 through openings in the side walls. The lamp enclosures 80 are hinged to allow quick and easy access to change the lamps 84 85 within the enclosures 80. The power subsystem 36 components and lamp driver 96 are mounted in an enclosure 98 on the rear exterior of the illumination chamber 78. Multiple illumination sources can be used on the system by mounting multiple sets of lamp enclosures 80 on the side walls of the chamber 78 and shuttering the light sources so only one is illuminating the interior of the chamber 78 at a time. Access to the controlled illumination chamber 78 is through two doors. The interior of the illumination chamber 78 is flat white on the floors, three walls and the interiors of the doors. The ceiling of the illumination chamber 78 is flat black. This configuration yields extremely uniform illumination of the sample and eliminates reflections off the ceiling from affecting the color and appearance measurements of samples placed in the controlled illumination chamber 78. Samples that have high gloss will cause a reflection of the camera lens, and the surrounding opening of the temperature controlled camera enclosure, to appear in the image of the sample if a white ceiling is used. This is due to the contrast of the white ceiling compared to the black hole created by the opening through which the camera views the sample.

The gloss of samples can be measured using the controlled illumination chamber embodiment of the invention 10 by introducing one or more achromatic objects, with a contrasting lightness to the ceiling, just below the ceiling of the illumination chamber 78. Images of the sample being measured with and without the achromatic object in place can be captured and compared to determine the gloss of the sample being measured. The image of the sample captured without the achromatic object in place is subtracted, pixel by pixel, from the image of the sample captured with the achromatic object in place. Any negative values, caused by temporal noise variations, may be set equal to zero to simplify computational requirements. The pixels within the area of interest (AOI), positioned within the reflected image of the achromatic object, are then averaged to determine the reflectance value for the sample being measured. This value is then compared to values obtained by measuring a sample set with know gloss values. Interpolation methods are used to determine the precise gloss reading for the sample being measured. The described method is most effective for gloss levels between 20 and 90 when measured in accordance with the parameters defined by ASTM D523 using the 60° geometry.

The texture of samples can be measured using the controlled illumination chamber embodiment of the invention 10 by introducing an achromatic object, with a contrasting lightness to the ceiling, just below the ceiling of the illumination chamber 78. Images of the sample being measured with and without the achromatic object in place can be captured and compared to determine the amount of texture present on the sample being measured. The image of the sample captured without the achromatic object in place is subtracted, pixel by pixel, from the image of the sample captured with the achromatic object in place. Any negative values, caused by temporal noise variations, may be set equal to zero to simplify computational requirements. The pixel patterns within the AOI defined for the reflected image of the achromatic object are then processed using various algorithms to quantify the surface texture of the sample being measured.

Reliable and repeatable performance of the invention 10 is enhanced by precautions built into the power subsystem of the invention 10. FIG. 11 illustrates the various components and interconnects of the power subsystem. The ac line voltage 100 is passed through an isolation transformer 102 to provide a constant ac voltage to the camera ac to dc power supply 104 and the control circuit power supply 106. This ensures that output from these dc power supplies will remain within allowable ranges even if the ac supply voltage 100 varies. The input ac supply voltage 100 is fused with a fuse 108 to prevent damage to the power supplies and system electronics in the event of a power surge on the ac supply line 100. A surge suppression filter 110 is also installed to prevent damage to the power supplies and system electronics from high frequency spikes that can occur on the ac supply line 100. This conditioned and filtered ac power is also used by the illumination subsystem 34 and computer subsystem 30 to ensure maximum system reliability.

SYSTEM CALIBRATION

Calibration of the invention 10, as depicted in FIG. 12, is performed to overcome long term and short term variations in the lighting and electronics of the image capture system. The calibration comprises the steps of dynamic range calibration 120, non-uniformity correction calibration 122, and calorimetric calibration 124. A reference measurement of the illumination source is captured during the colorimetric calibration to establish a baseline of lamp intensity and correlated color temperature to be referenced during subsequent measurements. This illumination reference reading provides a means to monitor changes in the illumination and to compensate for any differences that may occur, ensuring consistent system performance.

FIG. 13 illustrates the dynamic range calibration standard 126. A white tile 128 and optical black trap 130 are measured to program the dynamic range of the image capture system by automatically adjusting the camera 14 black point and white point and balancing the three RGB color channels. The dynamic range calibration standard 126 is constructed as a single unit, with a white Russian Opal 128 and an optical black trap 130 in one convenient unit. The unit is designed to be easily disassembled to clean the internal glass surfaces of the optical black trap. The optical black trap uses 5 surface reflections to ensure minimum light return from the trap. The trap uses 2 pieces of black glass 132 mounted 45° from the incoming light and 90° to one another. A gray background surrounds the white and black portions of the dynamic range calibration standard to reduce the ringing that can occur in the video signal of the camera 14 as the image transitions from white to black.

Figure 14:
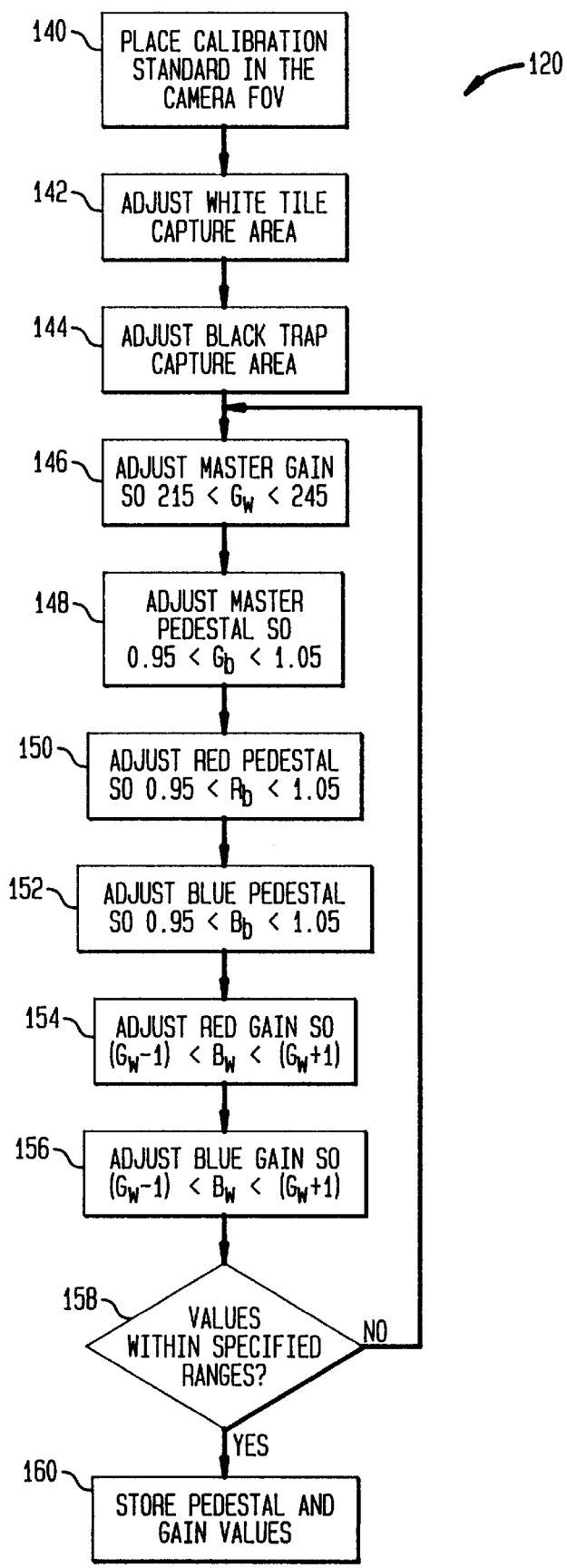
FIG. 14 diagrams the steps necessary to calibrate the dynamic range of a color camera for a given illuminant.

FIG. 14 charts the procedure followed when performing the dynamic range calibration 120. The system is placed into live capture mode upon entering the dynamic range calibration routine 120 to allow the operator to place the calibration standard in the field of view (FOV) 140 of the camera. The operator defines the placement and size of two areas of interest (AOIs) 142 144, one each for the portion of the image within the area of the optical black trap 130 and the white Russian Opal 128. At least one measurement of the calibration standard is captured and averaged to determine the baseline readings for the system. If the system measurements fall within the limits prescribed below, the system is considered to be calibrated, with no further adjustments being necessary.

TABLE 1

Limits for a properly calibrated system

| Black AOI | $0.95 < R_B < 0.15$ | $0.95 < G_B < 1.05$ | $0.95 < R_B < 1.05$ |
|---|---|---|---|
| White AOI | $\|Max_{RGB} - Min_{RGB}\| < 1.0$ | and | $215 < G_W < 245$ | where
$R_B$ = Red channel value in the Black AOI
$G_B$ = Green channel value in the Black AOI
$B_B$ = Blue channel value in the Black AOI
$R_W$ = Red channel value in the White AOI
$G_W$ = Green channel value in the White AOI
$B_W$ = Blue channel value in the White AOI
$Max_{RGB}$ = The maximum of $R_W$, $G_W$, and $B_W$
$Min_{RGB}$ = The minimum of $R_W$, $G_W$, and $B_W$ If the initial readings from the camera indicate adjustments are required, the $G_W$ level is first checked to ensure it is within the range from $215<G_W<245$ 146. The master gain (MGAIN) is varied in the range from $0 \leq MGAIN \leq 5$. If it becomes necessary to increase the MGAIN value greater than 5, the system is placed in live capture mode and the operator is instructed to adjust the aperture of the lens so the image becomes brighter. If it becomes necessary to decrease the MGAIN value below 0, the system is placed in live capture mode and the operator is instructed to adjust the aperture of the lens so the image becomes darker. After the operator has confirmed the iris has been adjusted, the MGAIN level is set to 0 and adjustment of MGAIN is repeated. This procedure is repeated until the $215<G_W<245$ requirement has been met. The operator has the ability to override the MGAIN$\leq$5 limit if it becomes necessary due to an inconvenience of adjusting the lens iris or, the maximum aperture size has been obtained and the $215<G_W<245$ limit has yet to be met. The master pedestal (MPED) level is adjusted so that the green channel reading of the black AOI meets the limits established by the range $0.95<G_B<1.05$ 148. Table 1 references the same criteria be used to adjust the red pedestal (RPED) 150 and blue pedestal (BPED) levels 152. The red gain (RGAIN) level is adjusted to ensure the red channel value from the white AOI falls within the range of $[G_W-1]<R_W<[G_W+1]$ 154. The same procedure is used to adjust the blue gain (BGAIN) level to within the range $[G_W-1]<B_W<[G_W+1]$ 156. An average of multiple readings is then computed to confirm the camera is properly adjusted and that the system falls within the prescribed calibration limits listed in table 1. If any of the RGB combinations of values measured in the black and white AOIs fall outside the prescribed limits, the described adjustment procedures are repeated as necessary 158. The resultant gain and pedestal settings for the camera 14 are then stored in the appropriate data file 160.

Figure 15:
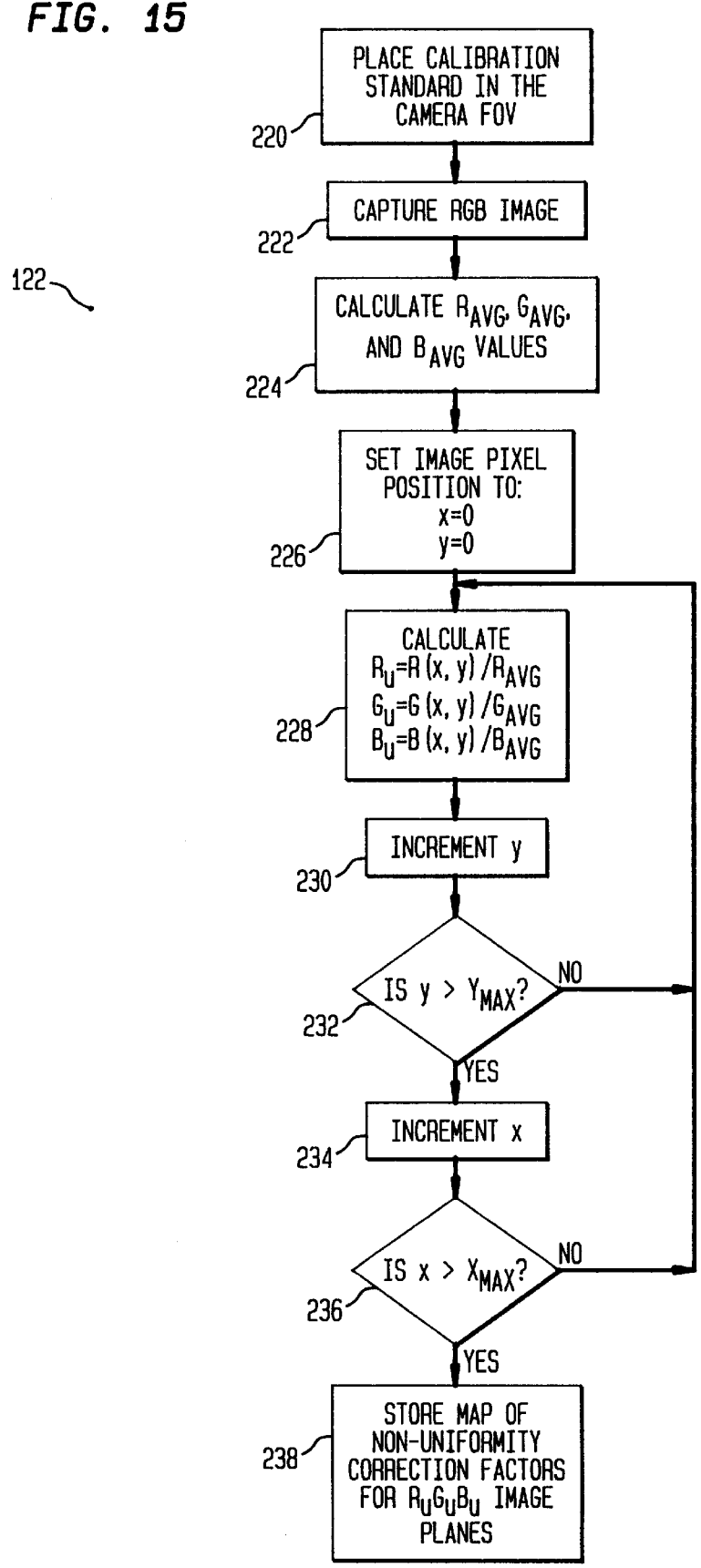
FIG. 15 describes the procedure to correct for non-uniformities in the responsivity of a color camera, and in the spatial distribution of the lamp intensity for a given illumination source.

FIG. 15 diagrams the procedure used for the non-uniformity correction calibration 122. A uniform white standard is within the field of view of the camera 220. At least one measurement of the non-uniformity correction calibration standard is captured and averaged to minimize temporal noise effects on the measurement data 222. The average value for the captured pixels is calculated for each of the R, G, and B image planes 224. Each pixel in the R plane is then divided by the value of the calculated average for the R plane to create a two-dimensional map of ratio factors 228. The described calculations are repeated for the G and B image planes 228. The resultant three arrays of data represent contour maps of the spatial non-uniformities of the camera system and are stored 238. These contour maps are used to compensate for the spatial non-uniformities present in every image capture. The spatial non-uniformity correction calibration removes fixed pattern noise in the camera system. Fixed pattern noise (FPN) can be caused by variations in lighting intensity across the FOV, pixel to pixel variations in the camera responsivity across the imager, and differences in the optical path length through the dichroic beamsplitting prism block that separates the incoming light flux into its three component colors. A white calibration tile is measured to correct for these spatial non-uniformities across the field of view of the imaging system.

Figure 16:
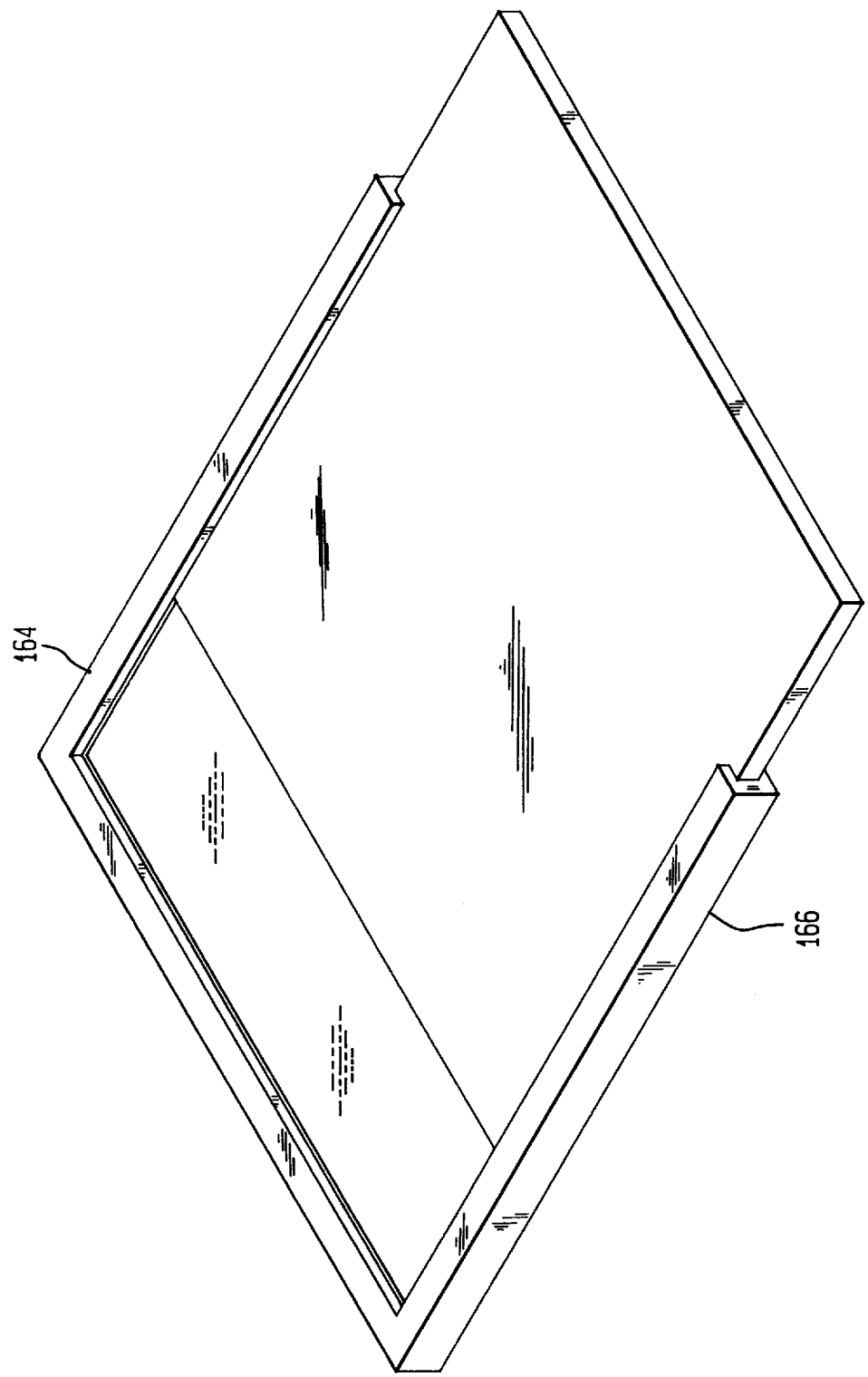
FIG. 16 provides a perspective view of a non-uniformity correction calibration standard in its protective case.

The non-uniformity correction standard 164 (FIG. 16) is 16" by 16" nominally, excluding the supporting frame or enclosure 168. It is presented to the system so it encompasses the entire FOV. Also, it is mounted the proper distance from the camera to keep the standard within the depth of focus of the target plane of the camera system, meaning that no lens adjustment is necessary to properly focus the camera onto the non-uniformity correction standard. The non-uniformity correction standard 164 is made from a carefully chosen piece of solid surface material, such as Dupont Corian or Nevamar Fountainhead, and is housed in a container such that the operator need not touch the front surface of the standard. Variations in surface uniformity do not exceed 0.75 dE over the entire surface of the standard. Measurements of the non-uniformity correction standard 164 are made at no less than 70 locations across the active surface of the standard, using a C.A.T./HS-1000 spectrophotometer in specular included mode or equivalent method. The two measurements having the greatest dE between them are used in determining the acceptability of the non-uniformity correction standard.

Figure 17:
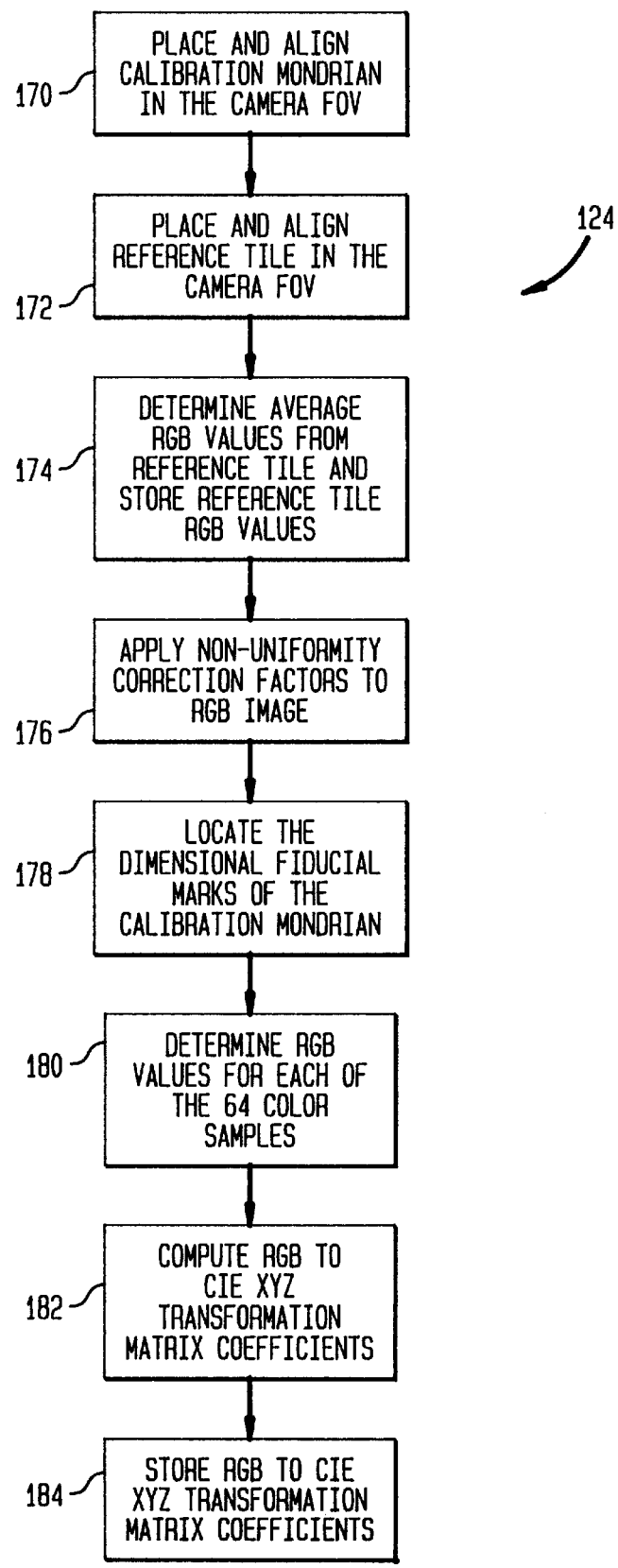
FIG. 17 illustrates the colorimetric calibration procedure, along with the capture and storage of the dual beam correction values, to determine the necessary coefficients to transform the RGB values from the color camera to CIE XYZ values.

For proper colorimetric evaluation using the invention 10, the output from the camera must be mapped from the camera's RGB domain to CIE XYZ tristimulus values. The best method is to develop a transformation matrix that will be applied to all of the pixels in the image to generate an image of CIE XYZ values. The calorimetric calibration procedure 124 documented in FIG. 17 is performed after the dynamic range calibration and non-uniformity correction calibration are complete.

Figure 18:
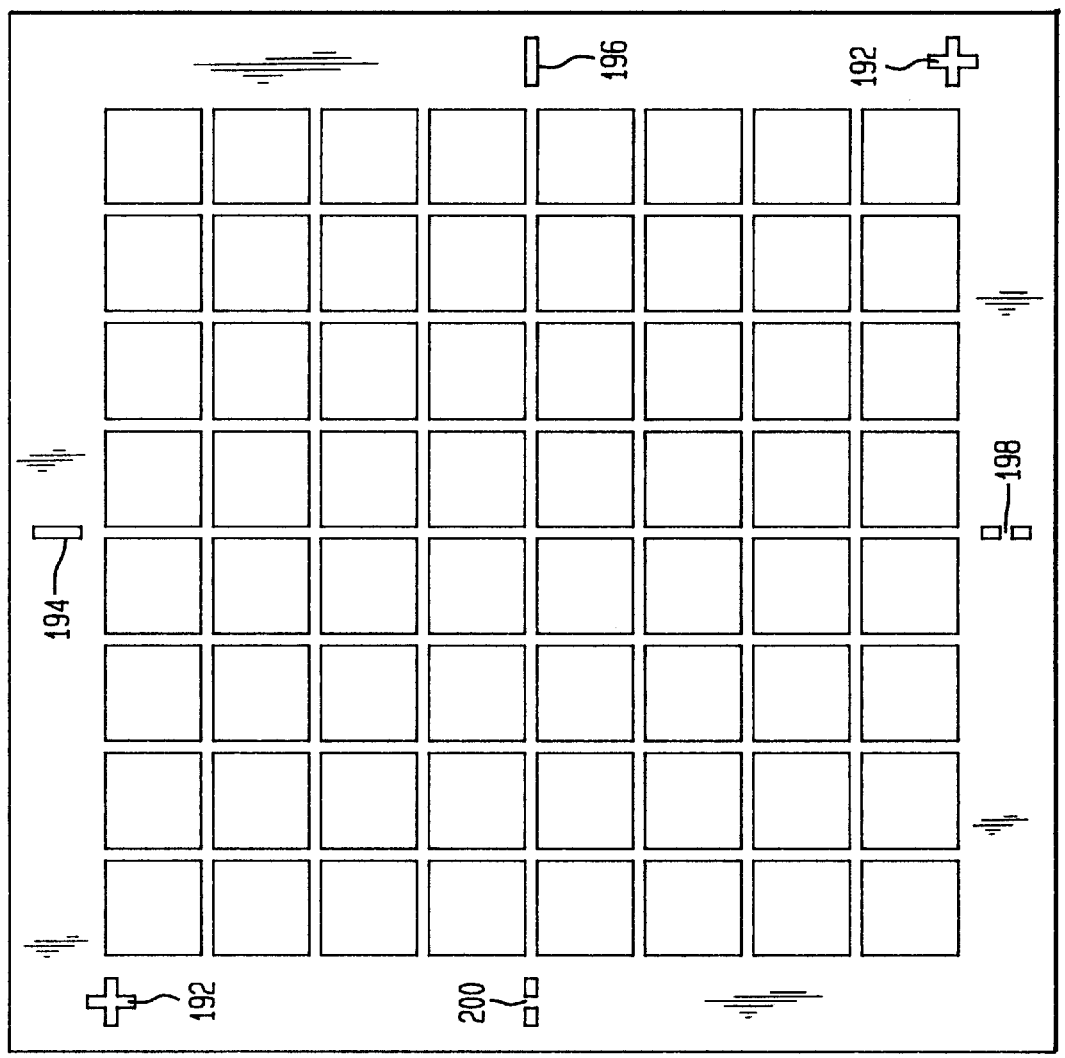
FIG. 18 is a top view illustration of the colorimetric calibration mondrian, with its 64 defined color samples, alignment fiducial marks, and dimensional fiducial marks.

A calorimetric calibration mondrian 168 of 64 colored samples, depicted in FIG. 18, is measured to calculate the necessary transformation matrix coefficients for converting camera RGB color space to the CIE XYZ color space. This calibration makes use of artificial intelligence methods to derive the best possible conversion coefficients. Both the photometric and chromaticity scales of the invention 10 are set by this calibration. The calorimetric calibration mondrian containing 64 samples is aligned in the center of the camera's FOV 170. A uniform white tile, which serves as a dual beam correction standard 190, is also placed along an edge of the FOV 172. Temporal noise reduction techniques are employed by capturing at least one image of the colorimetric calibration mondrian 168, and the dual beam correction standard 190, and averaging the measurements at each pixel site. After the RGB values for the dual beam correction standard are calculated and stored 174, the spatial non-uniformity correction contour maps are applied to the three image planes of the resultant image. The dimensional fiducial marks 192 are located and confirmed by the system operator 178 so the global RGBs for each of the 64 samples can be calculated for use in the artificial intelligence-based matrix trainer. The trainer uses the RGB values captured in the camera system and pre-stored CIE XYZ values, integrated for the illuminant under which the calorimetric calibration mondrian has been captured, for the 64 samples to calculate a 3×4 transformation matrix 182. The transformation matrix is stored in the appropriate calibration file 184.

The artificial intelligence-based RGB to CIE XYZ transformation matrix optimizer is designed to solve the set of equations:

$$X = C_{XR}R + C_{XG}G + C_{XB}B + C_{Xo},$$

$$Y = C_{YR}R + C_{YG}G + C_{YB}B + C_{Yo},$$

and $$Z = C_{ZR}R + C_{ZG}G + C_{ZB}B + C_{Zo}.$$

The input training values from the measurements of the 64 colorimetric calibration mondrian samples are stored into arrays $R_n$, $G_n$, $B_n$ associated with output variable $V_n(X_n, Y_n, Z_n)$. The objective of the optimizer is to minimize the given objective function:

$$O_{RGB \to XYZ} = \sum_{i=1}^{n} (V_i - (C_{VR}R_i + C_{VG}G_i + C_{VB}B_i + C_{Vo}))^2,$$

by perturbing the coefficients, $C_{VR}$, $C_{VG}$, $C_{VB}$ and $C_{Vo}$. Classic parallel and serial optimizers are alternately applied through six iterations to train the RGB to CIE XYZ transformation matrix. The parallel optimizer is initiated with $C_{VR}$, $C_{VG}$, $C_{VB}$ and $C_{Vo}$, such that $$C_{Vo} = \sum_{i=1}^{n} \frac{(V_i)}{n}, \text{ and}$$

$$C_{VR} = C_{VG} = C_{VB} = 0.$$

All of the coefficients are changed simultaneously, deriving new coefficients of $(C_{VR+1}, C_{VG}, C_{VB}, C_{Vo})$, $(C_{VR}, C_{VG+1}, C_{VB}, C_{Vo})$, $(C_{VR}, C_{VG}, C_{VB+1}, C_{Vo})$, and $(C_{VR}, C_{VG}, C_{VB}, C_{Vo+1})$. All 5 sets of coefficients are scored by the objective function and sorted. A centroid set of coefficients is calculated and scored for all except the worst case set of coefficients. The worst set of coefficients is applied and reflected through this centroid, creating a new set of coefficients, R. If coefficient set R is determined to be the best yet, another set of coefficients, E, is created by extending a line from R through the centroid, and scoring. If E is determined to be better than R, the R set of coefficients are reset to E. The second worst scoring set of coefficients from above is then compared to R. If R is better than the second worst, the worst set of coefficients is reset to R and the cycle is repeated. Otherwise, a new set of coefficients, S, is created on a line from the worst set through the centroid. If S is better than the worst, the worst set of coefficients is reset to that of set S. This procedure is repeated to determine the optimum set of coefficients. The parallel optimizer gradually converges towards a single best set of coefficients and returns that set for input to the serial optimizer. The serial optimizer is defined to perform twenty-five cycles for each of the four coefficients. For each of the four coefficients, a new coefficient is created by adding an addend, $\epsilon$, defined by the set:

$\epsilon = \{-1, -0.1, -0.01, -0.001, -0.0001, -0.00001, 0.00001, 0.0001, 0.001, 0.01, 0.1, 1\}$ Each perturbation of each coefficient is processed through the objective function along with the current values for the three other coefficients to derive a new $O_{RGB \to XYZ}$. The set of coefficients that yields the smallest $O_{RGB \to XYZ}$ is retained for the next iteration. This process is repeated for twenty-five times to optimize the coefficients of the calorimetric calibration matrix.

The colorimetric calibration mondrian 168 consists of 64 separate sample regions. The samples are arranged in a square matrix that is 8 samples wide and 8 samples high. The sample regions are positioned so their centers are equidistant from each other along the horizontal and vertical axes, producing an aspect ratio of 1:1. Eight of the samples are achromatic and vary in lightness level from 35 to 95. All of the samples are within the color gamut of the camera to ensure the camera is operating in its linear region during calibration. The background material surrounding the individual color samples is achromatic having lightness level in the range from 60 to 70. The spacing between adjacent samples is less than 2 mm, with total error in placement not to exceed 2 mm, when measured along the vertical or horizontal axis of the standard. A border of at least one sample width surrounds the samples in the matrix. Alignment fiducial marks are placed at the 12 o'clock 194 and 3 o'clock 196 positions in this border region. The alignment fiducial marks 194, 196 are provided to assist the system operator to properly align the calorimetric calibration mondrian 168 in the image plane. The marks each consist of a single line, with length no less than one-half the width of a sample, and a width of 2 mm±0.2 mm. The alignment fiducial marks are oriented so imaginary lines projected along the marks intersect in the center of the sample matrix. The angle between the two projected lines are not to deviate from 90° by more than 5 arc-minutes. Secondary alignment fiducial marks 198 200 are also placed at the 6 o'clock 198 and 9 o'clock 200 positions of the standard. The secondary alignment marks 198 200 are coincident with the projected lines defined above, within 2 arc-minutes, and meet the size restrictions specified above, except they consist of two line segments separated by a space equal to 20% of the total line length. Two dimensional fiducial marks 192 are used to determine the scaling for measuring the 64 color samples on the color calibration standard, and are positioned in the border of the standard on the upper left corner and the lower right corner. Each dimensional fiducial mark 192 consists of two perpendicular lines, 2 mm±0.2 mm in width and a length of one-half of a sample region width. The two lines intersect each other in the center of the other respective line segment to form a mark that resembles a plus sign. The angle between the two lines must not deviate from 90° by more than 2 arc-minutes. The two dimensional fiducial marks 192 are positioned in the border of the calorimetric calibration mondrian 168 so the horizontal line segments are aligned with the top and bottom outer edges of the sample matrix, within ±0.5 mm. The center of the horizontal line segment is one-half a sample region width from the left and right outer edges of the sample matrix, within ±0.5 mm. Angular rotation of the two dimensional fiducial marks 192, with respect to the alignment fiducial marks 194 196 should not exceed 2 arc-minutes. In other words, the horizontal line segment of each dimensional fiducial mark 192 must be parallel to the horizontal alignment fiducial mark 196 to within 2arc-minutes.

A dual beam correction standard 190 is captured simultaneously with the colorimetric calibration mondrian 168 to establish a baseline measurement of the illumination source intensity. This dual beam correction standard 190 is measured during all subsequent image captures. A ratio for each of the RGB values from the dual beam correction standard 190 and the baseline measurement are calculated to reference the measurement back to the system calibration. This procedure is equivalent to the dual beam correction methods employed by spectrophotometers and calorimeters to ensure excellent measurement repeatability. The dual beam correction standard is used to compensate for intensity and calorimetric variations in the illumination source. The dual beam correction standard 190 is 50 mm by 25 mm nominally. It is typically presented to the system in a manner that places it on an outer edge of the FOV. It is mounted the proper distance from the camera to keep the standard within the depth of focus of the target plane of the camera system, meaning that no lens adjustment is necessary to properly focus the camera onto the dual beam correction standard and the target concurrently.

A transformation from CIE color space to the color gamut of the image display monitor 18 is necessary so the appearance of the image on the screen most closely approximates the actual sample 46 being measured. The output from the calculated CIE XYZ tristimulus values of the image must be mapped to the monitor's RGB color space domain. The best method is to develop a display transformation matrix that will be applied to all of the pixels in the image to generate an image of appropriate RGB display values. The same artificial intelligence based transformation matrix optimizer, described herein, is used to solve a set of equations for a CIE XYZ to RGB transformation, given as:

$$R = C_{RX}X + C_{GX}Y\ C_{BX}Z + C_{RO},$$

$$G = C_{RY}X + C_{GY}Y\ C_{BY}Z + C_{GO},$$

and $$B = C_{RZ}X + C_{GZ}Y\ C_{BZ}Z + C_{BO},$$

A System Calibrator from Sequel Imaging is placed on the front surface of the image display monitor 18 and routines are run that measure the monitor's phosphor characteristics and gamma curves for a pre-determined set of RGB input values. These data are then input to the artificial intelligence based matrix trainer. The trainer uses the readings to calculate the 3×4 display transformation matrix coefficient values. The display transformation matrix coefficient values are then stored in the appropriate calibration file.

COLOR AND APPEARANCE MEASUREMENT METHOD

Figure 19:
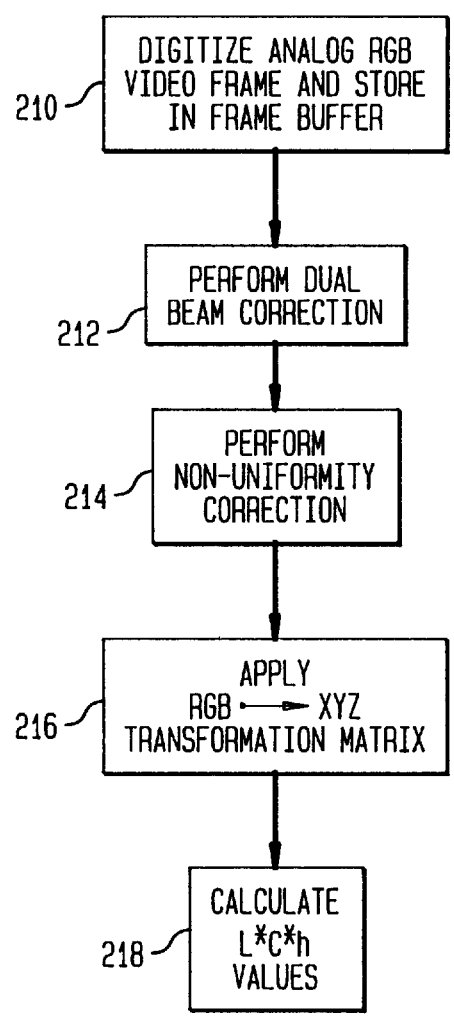
FIG. 19 describes the procedure for capturing an RGB image from the color camera, applying various correction factors to remove temporal and spatial noise from the image, transforming the image data from RGB color space to that of CIE XYZs, and calculating lightness, chroma, and hue values for evaluation of the color and appearance of the measured sample.

Measurement of a sample with the invention 10, as represented in FIG. 19, is a multi-step process that is performed automatically by the software contained in the computer 12. Once the measurement command is given, the next video frame from the camera 14 is digitized and stored into the frame buffer of the frame grabber 22 210. Averages of the RGB values are calculated for the defined dual beam correction AOI, which are compared against the dual beam correction standard values collected at the time of calibration. Correction factors are calculated and applied to the entire image to compensate for variations in the intensity and/or correlated color temperature of the lighting from capture to capture 212. The non-uniformity correction map is applied to the digitized RGB image to correct for the fixed pattern noise sources inherent in the video capture system 214. Every dual beam and non-uniformity corrected pixel is processed through the RGB to CIE XYZ transformation matrix to calculate the calorimetric value for each corresponding pixel in the image 216. The lightness, chroma, and hue values for each pixel are then calculated 218 per the methods defined in CIE publication 15.2. For interlaced video signals with pulsed light sources, the described operations are performed only on the video field for which the light source was activated. Otherwise, the described operations are performed on the entire frame of video data.

Quantifying the color and appearance quality of a sample 46 begins with defining the standard to which all subsequent batches will be compared. As previously described, the standard sample is first captured by the camera system and its RGB image is corrected for lighting variations and system non-uniformities before being transformed to CIE XYZ color space for the given illuminant. The L*C*h values for the each pixel in the entire image are then calculated. Four different measurement modes are available on the invention 10. The four measurement modes are designated as full screen/area search, multiple area search, specified area averaging, and concurrent standard and batch.

In full screen/area search measurement mode, the operator first defines one or more search AOIs in which to measure all of the desired color and appearance attributes of the sample. This search AOI can be the entire image area or a subset thereof. The measurement of all the color and appearance attributes for the sample are performed in this common AOI. Individual AOIs are defined for each of the desired color and appearance attributes to be measured. The L*C*h values for all of the pixels within each of the defined AOIs are displayed graphically on the data display monitor 20 in the form of three histogram plots. The hue values are displayed in the range from 0° to 360°, chroma values are displayed in the range from 0 to 100, and lightness values are depicted within the range from 0 to 112. The displays on the lightness and chroma histograms are subsets of the entire data range of L* and C*, based upon the selected hue range. The pixels that fall within the three selected search ranges are highlighted on the image display monitor 18, providing the operator with real time feedback as to how changes in the three search parameters affect the amount of the color and appearance attribute that is being measured. A range of acceptable L*C*h values for the desired color and appearance attribute is determined by the operator by analyzing the three histograms. Upon acceptance of all of the defined L*C*h search ranges, every pixel in the common search AOI is compared to each of the defined ranges. Only those pixels that fall within the defined L*C*h search range are used to calculate the L*C*h values for the desired color and appearance attribute of the sample. The percentage of pixels falling within the defined range, when compared to all of the pixels searched, is also reported.

Multiple area search measurement mode is identical to that described for the full screen/area search method, except only the defined search AOIs are searched to determine the measured color coordinates and percentage coverage. This measurement mode is more dependent on proper sample placement registration, unlike the full screen/area search method, since there is no common AOI and the color searches are limited to the defined AOIs.

Specified area averaging is typically used where there are large uniform areas of color with minimal effects from surface contours and texture. In the specified area averaging measurement mode, the operator first defines an AOI in which to measure the desired color and appearance attribute of the sample. This AOI can be the entire image or a subset thereof. Every pixel in the AOI is averaged to determine the L*C*h values for the desired color and appearance attribute. Subsequent batch samples must be placed so the appropriate color attributes appear within the defined AOIs.

Concurrent standard and batch measurement mode is typically used where there are large uniform areas of color with minimal effects from surface contours and texture on the standard and the batch. In this mode, the standard and at least one batch are placed within the field of view of the camera and measured simultaneously. The operator defines a measurement AOI for the standard, and at least one for the batch sample. Every pixel in the standard AOI is averaged to determine the L*C*h values for the standard. The same process is used to calculate the L*C*h values for the batch sample, which are then compared to the L*C*h values for the standard.

Cluster and vector analysis of the spatial patterns formed by the various color and appearance attributes can also be performed for the two search-based measurement modes, full screen/area search and multiple area search. The cluster analysis algorithm searches for contiguous pixel groups that fall within the defined search ranges within the search AOI. Several statistical values are calculated for these pixel groupings, also called blobs or clusters. The number of clusters is computed, along with the minimum, maximum, and average size of all the clusters found. Vector analysis of elongated spatial patterns formed by the various color and appearance attributes, such as wood grain, can also be performed. The vector analysis algorithm searches for contiguous pixel groups that fall within the defined search ranges along specified horizontal or vertical vectors within the search AOI. Several statistical values are calculated for the pixel groupings measured along the designated vectors, including the average number of crossings encountered along the vectors, the minimum, maximum, and average length of the desired color and appearance attribute, and the percentage of the vector length covered by the defined color and appearance attribute. The two described spatial pattern analysis tools, cluster analysis and vector analysis, can be enabled individually for each of the defined color and appearance attributes.

Defining a standard for either the full screen/area search or multiple area search measurement modes starts with the operator defining an AOI on the image display monitor 18. Each of the desired color and appearance attributes for each sample are defined using the described method. After all the desired attributes in the standard have been defined. Each pixel in the defined search AOI is compared to each of the search parameters. The average color of all pixels falling within each of the search ranges is calculated and stored. A percentage of the total area covered by the designated color and appearance attribute is also calculated and stored with the standard. Cluster analysis or vector analysis is performed for each of the color and appearance attributes where it has been enabled. Defining a standard for either the specified area averaging or concurrent standard and batch measurement modes starts with the operator defining an AOI on the image display monitor 18. Once all of the desired AOIs have been defined, the average L*C*h values are calculated for the pixels within the defined AOIs.

Batch samples are captured in the same manner as the standard, where the RGB image is corrected and converted to CIE XYZs and then to L*C*h values, maintaining the spatial information of each color region. If the full screen/area search or multiple area search measurement mode is enabled, each pixel in the defined search AOI is compared to the L*C*h search parameters for inclusion in the color calculations. Average L*C*h values for each of the defined color regions are calculated and compared to those of the standard. Color differences for each color region, along with the percent area coverage differences, are determined and stored in the system database. Additionally, cluster and/or vector analysis is performed for each color and appearance attribute where enabled. The differences between the batch and standard are determined and stored in the system database. If the specified area averaging or concurrent standard and batch measurement mode is enabled, average L*C*h values for each of the defined color regions are calculated and compared to those of the standard, and stored in the system database.

Pass/fail acceptability tolerances can be determined for each of the defined color regions and the cluster or vector analysis data. The calorimetric tolerances can be set up in CIELAB, CMC, or C.A.T./QC-AI. The latter method uses artificial intelligence techniques (U.S. Pat. No. 5,410,637) to combine sample measurements with visual assessments of the samples, determining acceptability criteria for the product based on visual judgments of the samples. The calorimetric and cluster or vector analysis tolerances for each of the separate color regions can then be combined to develop an overall color and appearance acceptability criteria for the product. This color and appearance acceptability difference can be determined by the following equation:

$$dA=[\alpha^2(dL^{*2}+dC^{*2}+dH^2)+\beta^2 dAOI\%^2+\gamma_1^2 dP_c^2+\gamma_2^2 dP_s^2+\delta_1^2 dV_c^2+\delta_2^2 dV_s^2+\delta_3^2 dV_A^2]^{1/2},$$

where $P_S$ is the average cluster size, $P_C$ is the number of clusters present, $V_S$ is the average length of the color and appearance attribute along the defined vector, $V_C$ is the number of occurrences along the vector, and $V_A$ is the percentage of the vector covered by the defined color and appearance attribute. The variables $\alpha$, $\beta$, $\gamma_i$, and $\delta_i$ are defined according to the conditions of the specific application, and whose sum must equal one.

The invention 10 just described has several distinct advantages over prior art devices.

First, the invention 10 provides non-contact method for measurement of spatially distributed colors to ensure a quality product is being produced. While non-contact instruments are currently available, these instruments integrate the entire viewed area into a single color measurement, providing no detail as to the component colors that exist in the measured area.

Second, the outlined three step calibration procedure and use of dual beam correction for all sample measurements provide the invention 10 with sensitivity, repeatability, and reproducibility that is comparable to that of a conventional calorimeter. Numerous considerations are taken into account to produce a color and appearance measurement system that repeatably measures absolute color and color differences. Due to the non-linear nature of color space, the absolute color calculations are better in some regions of color-space than others. However, the system is very good at accurately determining color differences in all regions of color-space.

Third, the invention 10 provides the ability to quantify appearance attributes of a sample, such as texture or graining, that cannot be measured with traditional color measuring instruments. Non-uniformities in the color of a sample 46 contribute to the overall appearance of the item and traditional color measuring instruments, i.e. spectrophotometers and calorimeters, integrate the entire viewed area into a single color measurement. These instruments cannot distinguish differences in the spatial patterns of color that give many products their distinctive appearance.

Fourth, the invention 10 makes possible at-line or on-line monitoring of color and appearance variations since it can be operated with a controlled pulsed Xenon light source 16.

Fifth, the results of the measurements can be used to establish pass/fail criteria using artificial intelligence-based tolerancing software. The lightness, chroma, and hue of the different color and appearance attributes can be analyzed to determine which attributes are contributing to the measured color differences. The measurement results can also be interfaced to shade sorting software for applications requiring product sorting.

Sixth, the software has a user friendly graphical user interface that automates the calibration procedure and allows the operator to perform full image searches within defined color ranges, which means the sample under investigation can be placed anywhere in the FOV, instead of having to be placed precisely in the same position every time as has been necessary with previous systems. The software automatically determines the 64 measurement areas for colorimetric calibration 124 based on input received from the operator as to the location of the two dimensional fiducial marks 192 of the calorimetric calibration mondrian 168. Another feature of the software is that it allows the operator to determine the color coordinates of an individual pixel in the image to assist the operator in setting the tolerance ranges for the color evaluation routines, or it will automatically determine the L*C*h search ranges based on the L*C*h values contained within an operator defined area of interest.

Seventh, no modifications to the commercially available 3-CCD camera 14 are required due to the unique calibration techniques employed by the invention 10. Commands are sent to the camera 14 via the RS-232 interface 38 of the computer 12 for calibration purposes.

Eighth, the camera 14 is housed in a temperature controlled enclosure 42 that maintains the camera 14 at a constant temperature to improve the stability of the camera output. Alignment of the camera 14 to the sample 46 is accomplished using the 5-axis mount 48 within the temperature controlled camera enclosure 42. The 5-axis mount 48 provides three linear axes of freedom and two rotational axes to ensure proper alignment of the camera 14.

Ninth, unwanted specular reflections from glossy samples 46 can be minimized in the directional lighting geometry of the pulsed xenon illuminated embodiment of the invention 10 using the polarization techniques describe herein.

Tenth, the pulsed xenon illuminated embodiment of the invention 10 provides for different illumination angles. Different color and appearance attributes can be easily measured since different types of samples require different measurement techniques.

Eleventh, the fluorescent lamp illuminated embodiment of the invention 10 provides extremely uniform lighting over a large surface area due to the unique design of the controlled illumination chamber 78. The white interior walls and black ceiling provide the optimum tradeoff for lighting efficiency and elimination of ghost reflections that appear when glossy samples are measured.

Twelfth, the illumination from the fluorescent lamps 84 85 is extremely stable due to careful monitoring and control of the lamp temperature and lamp intensity. The lamp temperature is maintained using a novel control method, turning on cooling fans and shutting them off before they can become fully energized. This technique, in combination with proper air filtering, ensures condensation of mercury on the interior of the lamp 84 85 walls does not occur. The lamp intensity is constantly measured and fed back to the 60 kHz lamp driver 96 to maintain constant light output from the lamps 84 85. The 60 kHz lamp driver 96 also prevents aliasing with the 60Hz timing of the video signal that would occur with conventional fluorescent lamp ballasts.

Finally, the ac line voltage 100 is filtered and stabilized with an isolation transformer 102 and surge suppressor 110 to minimize the impact of power line fluctuations on system integrity.

While the invention 10 has been described with reference to the preferred embodiment thereof, it will be appreciated by those of ordinary skill in the art that modifications can be made to the parts and methods that comprise the invention 10 without departing from the spirit and scope thereof.

We claim:

1. A method for quantifying color and appearance attributes of batch samples comprising the steps of:

calibrating a camera and an illumination source for the purpose of generating correction factors, wherein said calibrating step comprises the steps of dynamic range calibration, non-uniformity correction calibration, and colorimetric calibration, wherein said dynamic range calibration step comprises the steps of placing a calibration standard having a white tile portion and a black trap portion within the field of view of said camera, capturing at least one measurement of said calibration standard, averaging said at least one measurement of said calibration standard to determine baseline measurements for said camera, comparing said baseline measurements with pre-determined tolerances, adjusting camera gain settings and pedestal settings until said settings are within said pre-determined tolerances, and storing said camera gain settings and pedestal settings, wherein said non-uniformity correction calibration step comprises the steps of placing a uniform white standard within the field of view of said camera, obtaining at least one measurement of a non-uniformity correction calibration standard, averaging said at least one measurement of said non-uniformity calibration standard, calculating the average value of captured pixels in the R, G, and B image planes, dividing each pixel in the R plane by said average value of captured pixels in the R plane to create a two-dimensional map of correction factors, dividing each pixel in the G plane by said average value of captured pixels in the G plane to create a two-dimensional map of correction factors, dividing each pixel in the B plane by said average value of captured pixels in the B plane to create a two-dimensional map of correction factors, and storing the resultant non-uniformity correction factors which represent spatial non-uniformities present in every image captured;

measuring a standard sample;

measuring at least one batch sample; and comparing said color and appearance attributes of said at least one batch sample to said standard sample.

2. The method of claim 1 wherein said calorimetric calibration step comprises the steps of:

aligning a dual beam correction standard reference tile within the field of view of said camera;

determining a first set of average RGB values from said dual beam correction standard reference tile;

storing said first set of dual beam correction standard reference tile RGB values;

aligning a calibration mondrian of color samples having dimensional fiducial marks around the periphery of said mondrian within the field of view of said camera;

capturing at least one measurement of said calibration mondrian;

averaging said at least one measurement of said calibration mondrian yielding an averaged calibration mondrian measurement;

locating said dimensional fiducial marks of said calibration mondrian;

applying said non-uniformity correction factors to said averaged calibration mondrian measurement;

determining RGB values for each of the color samples of said mondrian;

generating RGB to XYZ transformation matrix coefficients; and storing said transformation matrix coefficients.

3. The method of claim 2 wherein said step of measuring a standard sample comprises the steps of:

illuminating a standard sample with said illumination source;

capturing an RGB color space image of said standard sample with said camera;

determining a second set of average RGB values from said dual beam correction standard reference tile;

calculating dual beam correction factors from said first and second sets of average RGB values from said dual beam correction standard reference tile;

applying said dual beam correction factors to said captured RGB color space image of said standard sample yielding a dual beam corrected image of said standard sample;

applying said non-uniformity correction factors to said dual beam corrected image of said standard sample yielding a corrected RGB color space image of said standard sample;

applying said transformation matrix coefficients to said corrected RGB color space image of said standard sample yielding a CIE XYZ color space image of said standard sample;

storing said CIE XYZ color space image of said standard sample;

mapping said CIE XYZ color space image of said standard sample to an L*C*h color space image of said standard sample; and storing said L*C*h color space image of said standard sample.

4. The method of claim 3 wherein said measuring at least one batch sample comprises the steps of:

illuminating said at least one batch sample with said illumination source;

capturing an RGB color space image of said at least one batch sample with said camera;

determining a second set of average RGB values from said dual beam correction standard reference tile;

calculating dual beam correction factors from said first and second sets of average RGB values from said dual beam correction standard reference tile;

applying said dual beam correction factors to said captured RGB color space image of said at least one batch sample yielding a dual beam corrected image of said at least one batch sample;

applying said non-uniformity correction factors to said dual beam corrected image of said at least one batch sample yielding a corrected RGB color space image of said at least one batch sample;

applying said transformation matrix coefficients to said corrected RGB color space image of said at least one batch sample yielding a CIE XYZ color space image of said at least one batch sample;

storing said CIE XYZ color space image of said at least one batch sample;

mapping said CIE XYZ color space image of said at least one batch sample to an L*C*h color space image of said at least one batch sample; and storing said L*C*h color space image of said at least one batch sample.

5. The method of claim 4 wherein said comparing color and appearance attributes of said at least one batch sample to said standard sample comprises the steps of:

designating a common area of interest within said standard sample and said at least one batch sample for each of the color and appearance attributes to be measured;

defining individual areas of interest within said standard sample and said at least one batch sample for each color and appearance attribute to be measured;

displaying L*C*h values for all of the pixels within said defined individual areas of interest within said standard sample in histogram form such that hue values range from 0 degrees to 360 degrees, chroma values range from 0 to 100, and lightness values range from 0 to 112;

highlighting pixels falling within said lightness range, chroma range, and hue range;

defining an acceptable range of lightness, chroma, and hue values by analyzing said histogram;

comparing every pixel in said common area of interest within said standard sample and said at least one batch sample to each of said defined ranges;

calculating L*C*h values for each said color and appearance attribute of said standard sample and said at least one batch sample using only pixels falling within said defined ranges;

measuring the percentage of pixels falling within said defined ranges for each said color and appearance attribute of said standard sample and said at least one batch sample; and comparing said at least one batch sample measurements to said standard sample measurements.

6. The method of claim 5 further comprising the steps of:

searching for contiguous pixel groupings falling within said defined ranges within said common area of interest of said standard sample and said at least one batch sample;

calculating statistical values for said contiguous pixel groupings of said standard sample and said at least one batch sample including the number of said contiguous pixel groupings, the minimum size of said contiguous pixel groupings, the maximum size of said contiguous pixel groupings, and the average size of said contiguous pixel groupings; and comparing said at least one batch sample values to said standard sample values.

7. The method of claim 6 wherein said comparing said at least one batch sample measurements to said standard measurements is represented by:

$$dA=[\alpha^2(dL^{*2}+dC^{*2}+dH^2)+\beta^2 dAOI\%^2+\gamma_1^2 dP_c^2+\gamma_2^2 dP_s^2+\delta_1^2 dV_c^2+\delta_2^2 dV_s^2+\delta_3^2 dV_A^2]^{1/2};$$

where dA is a difference in appearance;

where $L^*$ is lightness;

where $C^*$ is chroma;

where h is hue;

where AOI% is the percentage of pixels falling within the defined range, when compared to all of the pixels searched;

where $P_S$ is the average cluster size;

where $P_C$ is the number of clusters present;

where $V_S$ is the average length of the color and appearance attribute along the defined vector;

where $V_C$ is the number of occurrences along the vector;

where $V_A$ is the percentage of the vector covered by the defined color and appearance attribute; and where the variables $\alpha$, $\beta$, $\gamma_1$, $\gamma_2$, $\delta_1$, $\delta_2$, and $\delta_3$ are defined according to the conditions of the specific application, and whose sum must equal one.

8. The method of claim 5 further comprising the steps of:

searching for contiguous pixel groups falling within said defined ranges along at least one specified vector within said common area of interest within said standard sample and said at least one batch sample;

calculating statistical values for said contiguous pixel groupings within said standard sample and said at least one batch sample including the average number of crossings encountered along said at least one specified vector, the minimum length of said contiguous pixel groupings along said at least one specified vector, the maximum length of said contiguous pixel groupings along said at least one specified vector, the average length of said contiguous pixel groupings along said at least one specified vector, and the percentage of said vector length covered by said contiguous pixel groupings along said at least one specified vector; and comparing said at least one batch sample values to said standard sample values.

9. The method of claim 8 wherein said comparing said at least one batch sample measurements to said standard measurements is represented by:

$$dA=[\alpha^2(dL^{*2}+dC^{*2}+dH^2)+\beta^2 dAOI\%^2+\gamma_1^2 dP_c^2+\gamma_2^2 dP_s^2+\delta_1^2 dV_c^2+\delta_2^2 dV_s^2+\delta_3^2 dV_A^2]^{1/2};$$

where dA is a difference in appearance;

where $L^*$ is lightness;

where $C^*$ is chroma;

where h is hue;

where AOI% is the percentage of pixels falling within the defined range, when compared to all of the pixels searched;

where $P_S$ is the average cluster size;

where $P_C$ is the number of clusters present;

where $V_S$ is the average length of the color and appearance attribute along the defined vector;

where $V_C$ is the number of occurrences along the vector;

where $V_A$ is the percentage of the vector covered by the defined color and appearance attribute; and where the variables $\alpha$, $\beta$, $\gamma_1$, $\gamma_2$, $\delta_1$, $\delta_2$, and $\delta_3$ are defined according to the conditions of the specific application, and whose sum must equal one.

10. The method of claim 4 wherein said step of comparing color and appearance attributes of said batch sample to said standard sample comprises the steps of:

defining individual areas of interest within said standard sample and said batch sample for each color and appearance attribute to be measured;

displaying $L^*C^*h$ values for all of the pixels within said defined individual areas of interest within said standard sample in histogram form such that hue values range from 0 degrees to 360 degrees, chroma values range from 0 to 100, and lightness values range from 0 to 112;

highlighting pixels falling within said lightness range, chroma range, and hue range;

defining an acceptable range of lightness, chroma, and hue values by analyzing said histogram;

comparing every pixel in said individual areas of interest within said standard sample and said batch sample to each of said defined ranges;

calculating $L^*C^*h$ values for each said color and appearance attribute of said standard sample and said batch sample using only pixels falling within said defined ranges;

measuring the percentage of pixels falling within said defined ranges for each said color and appearance attribute of said standard sample and said batch sample; and comparing said batch sample measurements to said standard sample measurements.

11. The method of claim 10 further comprising the steps of:

searching for contiguous pixel groupings falling within said defined ranges within said individual areas of interest of said standard sample and said batch sample; and calculating statistical values for said contiguous pixel groupings of said standard sample and said batch sample including the number of said contiguous pixel groupings, the minimum size of said contiguous pixel groupings, the maximum size of said contiguous pixel groupings, and the average size of said contiguous pixel groupings; and comparing said batch sample values to said standard sample values.

12. The method of claim 10 further comprising the steps of:

searching for contiguous pixel groups falling within said defined ranges along at least one specified vector within said individual areas of interest within said standard sample and said batch sample;

calculating statistical values for said contiguous pixel groupings within said standard sample and said batch sample including the average number of crossings encountered along said at least one specified vector, the minimum length of said contiguous pixel groupings along said at least one specified vector, the maximum length of said contiguous pixel groupings along said at least one specified vector, the average length of said contiguous pixel groupings along said at least one specified vector, and the percentage of said vector length covered by said contiguous pixel groupings along said at least one specified vector; and comparing said batch sample values to said standard sample values.

13. The method of claim 4 wherein said step of comparing color and appearance attributes of said batch sample to said standard sample comprises the steps of:

designating areas of interest within said standard sample and said batch sample for each of the color and appearance attributes to be measured;

averaging every pixel in said areas of interest within said standard sample and said batch sample to determine the L*C*h values for said color and appearance attribute; and comparing said batch sample L*C*h values to said standard sample L*C*h values.

14. The method of claim 4 wherein said step of comparing color and appearance attributes of said at least one batch sample to said standard sample comprises the steps of:

placing said standard sample and said at least one batch sample within the field of view of said camera;

measuring simultaneously said standard sample and said at least one batch sample;

defining an area of interest for said standard sample and for each of said at least one batch sample;

averaging every pixel in said standard sample area of interest to determine the L*C*h values for said standard sample;

averaging every pixel in said at least one batch sample area of interest to determine the L*C*h values for said at least one batch sample; and comparing said at least one batch sample L*C*h values to said standard sample L*C*h values.

15. The method of claim 4 further including the step of measuring the gloss of a sample comprising the steps of:

utilizing an illumination chamber having flat white interior walls, a flat white interior floor, and a flat black interior ceiling adjacent to said illumination source wherein said illumination chamber and at least one illumination source are separated by a clear material;

introducing at least one achromatic object having a contrasting lightness to the ceiling of said illumination chamber just below the ceiling of said illumination chamber;

capturing images of said sample with and without said at least one achromatic object in place;

subtracting, pixel by pixel, said image captured without said at least one achromatic object in place from said image captured with said at least one achromatic object in place;

averaging the pixels in at least one area of interest positioned within the reflected image of said at least one achromatic object to determine a reflectance value for said sample;

comparing said reflectance value with known gloss values; and interpolating said reflectance and known values to determine a gloss reading for the sample being measured.

16. The method of claim 4 further including the step of measuring the texture of a sample comprising the steps of:

utilizing an illumination chamber having flat white interior walls, a flat white interior floor, and a flat black interior ceiling adjacent to said illumination source wherein said illumination chamber and at least one illumination source are separated by a clear material;

introducing at least one achromatic object having a contrasting lightness to the ceiling of said illumination chamber just below the ceiling of said illumination chamber;

capturing images of said sample with and without said at least one achromatic object in place;

subtracting, pixel by pixel, said image captured without said at least one achromatic object in place from said image captured with said at least one achromatic object in place; and processing the pixels in at least one area of interest positioned within the reflected image of said at least one achromatic object to quantify the surface texture of the sample being measured.

17. The method of claim 4 further including the step of approximating the true appearance of a sample for an RGB display comprising the steps of:

defining a display transformation matrix;

applying said display transformation matrix to said CIE XYZ color space image of said sample yielding a display of RGB data values that most closely approximate said sample.

18. A system for quantifying color and appearance attributes of batch samples comprising:

a camera for capturing an RGB image of a standard sample and at least one batch sample;

an illumination source for illuminating said standard sample and said at least one batch sample;

calibration means for calibrating said camera and said illumination source for the purpose of generating correction factors, wherein said calibration means comprises a dynamic range calibration standard, a non-uniformity calibration standard, a dual beam correction standard, and a colorimetric calibration standard, wherein said dynamic range calibration standard comprises a hollow rectangular box having an opening on the top side, an exterior white portion, and an interior black portion, wherein said white portion comprising a white tile mounted on the top side of said box adjacent to said opening, and said black portion comprising two pieces of black glass within said box mounted approximately 90 degrees to each other and approximately 45 degrees to incoming light entering said opening, wherein at least one measurement of said dynamic range calibration standard is captured and averaged to determine baseline measurements for said camera and said camera is adjusted if said baseline measurements are not within pre-defined tolerances; and computer processor means for controlling and compensating said camera, said illumination source, and said calibration means, measuring said standard sample and said at least one batch sample, digitizing said camera RGB image into RGB image data for said standard sample and said at least one batch sample, processing said digitized RGB image data from the RGB domain to the CIE XYZ tristimulus domain and then to the L*C*h color space domain, processing said digitized L*C*h color space data to determine appearance attributes, and comparing said at least one batch sample data to said standard sample data.

19. The system of claim 18 wherein said non-uniformity calibration standard comprises a uniform white standard tile wherein at least one measurement is captured and averaged to determine data for generating contour maps representing spatial non-uniformities of said camera and said illumination source.

20. The system of claim 19 wherein said dual beam correction calibration standard comprises a uniform white tile wherein at least one measurement of said dual beam correction standard is captured and averaged.

21. The system of claim 20 wherein said calorimetric calibration mondrian comprises a substantially square tile having 64 colored samples on the surface wherein said mondrian is measured to calculate transformation coefficients for converting image data from RGB color space to CIE XYZ color space.

22. The system of claim 21 wherein said illumination source comprises at least one lamp within at least one lamp enclosure adjacent to an illumination chamber such that said at least one lamp enclosure and said illumination chamber are separated by a clear material.

23. The system of claim 22 wherein said illumination chamber comprises:

a rectangular box having doors allowing access to the interior of said box;

the interior walls of said box being flat white;

the interior of said doors being flat white;

the interior floor of said box being flat white; and the interior ceiling of said box being flat black.

24. The system of claim 23 wherein said at least one lamp enclosure comprises:

a housing for at least one lamp; and at least one fan mounted within said housing connected to a thermistor circuit that activates said at least one fan at a specified temperature and deactivates said at least one fan when said thermistor circuit detects a specified reduction in temperature.

25. The system of claim 24 wherein said camera comprises a temperature controlled housing having a thermistor circuit that activates a fan at a specified temperature and deactivates said fan when said thermistor circuit detects a specified reduction in temperature.

26. The system of claim 21 wherein said camera comprises:

a temperature controlled housing having a thermistor circuit that activates a fan at a specified temperature and deactivates said fan when said thermistor circuit detects a specified reduction in temperature; and means for setting the shutter rate of said camera to integrate incoming light flux so as to prevent ambient light from influencing calorimetric measurements.

27. The system of claim 26 wherein said illumination source comprises means for illuminating a sample with a strobe lamp such that said strobe lamp flashes at a resolution at least equal to said camera shutter rate.

28. The system of claim 18 wherein said camera is a digital camera.

29. A method for quantifying color and appearance attributes of batch samples comprising the steps of:

calibrating a camera and an illumination source for the purpose of generating correction factors, including the steps of a dynamic range calibration and a non-uniformity correction calibration, wherein said non-uniformity correction calibration comprises the steps of placing a uniform white standard within the field of view of said camera, obtaining at least one measurement of a non-uniformity correction calibration standard, averaging said at least one measurement of said non-uniformity calibration standard, calculating the average value of captured pixels in the R, G, and B image planes, dividing each pixel in the R plane by said average value of captured pixels in the R plane to create a two-dimensional map of correction factors, dividing each pixel in the G plane by said average value of captured pixels in the G plane to create a two-dimensional map of correction factors, dividing each pixel in the B plane by said average value of captured pixels in the B plane to create a two-dimensional map of correction factors, and storing the resultant non-uniformity correction factors which represent spatial non-uniformities present in every image captured;

measuring a standard sample;

measuring at least one batch sample; and comparing said color and appearance attributes of said at least one batch sample to said standard sample.

30. A system for quantifying color and appearance attributes of batch samples comprising:

a camera for capturing an RGB image of a standard sample and at least one batch sample;

an illumination source for illuminating said standard sample and said at least one batch sample;

calibration means for calibrating said camera and said illumination source for the purpose of generating correction factors, including a dynamic range calibration standard, wherein said dynamic range calibration standard comprises a hollow rectangular box having an opening on the top side, an exterior white portion, and an interior black portion, wherein said white portion comprising a white tile mounted on the top side of said box adjacent to said opening, and said black portion comprising two pieces of black glass within said box mounted approximately 90 degrees to each other and approximately 45 degrees to incoming light entering said opening, wherein at least one measurement of said dynamic range calibration standard is captured and averaged to determine baseline measurements for said camera and said camera is adjusted if said baseline measurements are not within pre-defined tolerances; and computer processor means for controlling and compensating said camera, said illumination source, and said calibration means, processing said RGB image data, and comparing said at least one batch sample processed RGB image data to said standard sample processed RGB image data.

* * * * *